United States Patent
Nakatsuka et al.

(10) Patent No.: US 8,716,916 B2
(45) Date of Patent: May 6, 2014

(54) VIBRATION GENERATOR, VIBRATION GENERATION DEVICE, AND ELECTRONIC EQUIPMENT AND COMMUNICATION DEVICE PROVIDED WITH VIBRATION GENERATION DEVICE

(75) Inventors: Hiroshi Nakatsuka, Osaka (JP); Hiroki Takeuchi, Osaka (JP); Keiji Onishi, Osaka (JP)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 13/881,558

(22) PCT Filed: Jun. 7, 2012

(86) PCT No.: PCT/JP2012/003729
§ 371 (c)(1),
(2), (4) Date: Apr. 25, 2013

(87) PCT Pub. No.: WO2012/169196
PCT Pub. Date: Dec. 13, 2012

(65) Prior Publication Data
US 2013/0221799 A1    Aug. 29, 2013

(30) Foreign Application Priority Data
Jun. 10, 2011   (JP) .................. 2011-129731

(51) Int. Cl.
  *H02K 5/00*   (2006.01)
  *H02N 1/00*   (2006.01)
  *H02N 1/06*   (2006.01)
  *H02N 1/08*   (2006.01)
(52) U.S. Cl.
  USPC .................... 310/309; 310/40 MM; 310/308; 310/310
(58) Field of Classification Search
  CPC ............................... H02N 1/008; H02N 1/006
  USPC .................... 310/300, 308, 309, 310, 40 MM
  IPC .......................................................... H02K 5/00
  See application file for complete search history.

(56) References Cited

U.S. PATENT DOCUMENTS

| | | |
|---|---|---|
| 2004/0007877 A1 | 1/2004 | Boland et al. |
| 2004/0016120 A1 | 1/2004 | Boland et al. |

(Continued)

FOREIGN PATENT DOCUMENTS

| | | |
|---|---|---|
| JP | 2005-529574 | 9/2005 |
| JP | 2007-253126 | 10/2007 |

(Continued)

OTHER PUBLICATIONS

Machine translation of WO2010150472, Nakatsuka et al., Dec. 2010.*

(Continued)

*Primary Examiner* — Terrance Kenerly
(74) *Attorney, Agent, or Firm* — Wenderoth, Lind & Ponack, L.L.P.

(57) ABSTRACT

A vibration power generator including a first substrate; first electrodes disposed over one surface of the first substrate; a second substrate spaced from the first substrate and opposed to the one surface of the first substrate; and second electrodes disposed over one surface of the second substrate so as to be opposed to the first electrodes, wherein one of the first and second electrodes includes a film holding a charge; one of the first and second substrates is a vibratory substrate; and an overlapped area between the first and second electrodes becomes minimum and then maximum, or becomes maximum and minimum, and an electrostatic capacity Cp formed between the first and second electrodes when the overlapped area becomes maximum changes, and the change of Cp comprises an increase of Cp, while the vibratory substrate is displaced from the vibration center to the vibration end.

14 Claims, 21 Drawing Sheets

(56) References Cited

U.S. PATENT DOCUMENTS

| | | | |
|---|---|---|---|
| 2006/0214534 A1* | 9/2006 | Thomas | 310/309 |
| 2009/0236932 A1* | 9/2009 | Matsubara | 310/309 |
| 2010/0072855 A1* | 3/2010 | Matsubara et al. | 310/300 |
| 2011/0043375 A1 | 2/2011 | Tanaka et al. | |
| 2011/0296917 A1* | 12/2011 | Reinmuth et al. | 73/514.32 |
| 2011/0316384 A1* | 12/2011 | Nakatsuka et al. | 310/300 |
| 2013/0099626 A1* | 4/2013 | Takeuchi et al. | 310/300 |

FOREIGN PATENT DOCUMENTS

| | | | | |
|---|---|---|---|---|
| JP | 2007-312551 | | 11/2007 | |
| JP | 2009-44949 | | 2/2009 | |
| JP | 2009-232615 | | 10/2009 | |
| JP | 2009-268309 | | 11/2009 | |
| JP | WO2010150472 | * | 12/2010 | H02N 99/00 |
| JP | 2011-42288 | | 3/2011 | |
| WO | 2011/067936 | | 6/2011 | |

OTHER PUBLICATIONS

International Search Report issued Sep. 4, 2012 in International (PCT) Application No. PCT/JP2012/003729.

Takumi Tsutsumino et al., "Electromechanical Modeling of Micro Electret Generator for Energy Harvesting", Transducers & Eurosensors 2007, France (2007), pp. 863-866.

Written Opinion of the International Searching Authority issued Sep. 4, 2012 in International (PCT) Application No. PCT/JP2012/003729.

Translation of the International Preliminary Report on Patentability issued Dec. 27, 2013 in International Application No. PCT/JP2012/003729.

* cited by examiner (a)

(b)

(a)

(b)

(a)

(b)

(a)

(b)

(a)

(b)

VIBRATION GENERATOR, VIBRATION GENERATION DEVICE, AND ELECTRONIC EQUIPMENT AND COMMUNICATION DEVICE PROVIDED WITH VIBRATION GENERATION DEVICE

TECHNICAL FIELD

The present invention relates to a vibration power generator, a vibration power generation apparatus, and a communication device and an electronic device with the vibration power generation apparatus mounted thereon. More particularly, the present invention relates to an electrostatic induction vibration power generator using electret material, an vibration power generation apparatus using the same, and a communication device and an electronic device with the vibration power generation apparatus mounted thereon.

BACKGROUND ART

As a conventional vibration power generation apparatus, an electrostatic induction vibration power generation apparatus is known in which an electric charge is applied to one electrode of a variable capacity and the electric charge is induced to another opposed electrode through electrostatic induction. The electric charge to be induced is varied by changing of the capacity. The electrostatic vibration power generation apparatus serves to generate power by taking out the change in electric charge as electric energy (see, for example, Patent Literature 1).

FIG. 16 shows a schematic cross-sectional view of a vibration power generator 10 disclosed in Patent Document 1 (see FIG. 4 and p. 10-11 of the same document), as one example of a conventional electrostatic induction vibration power generator using electret material.

The vibration power generator 10 includes a first substrate 11 with a plurality of conductive surface regions 13, and a second substrate 16 with a plurality of electret material regions 15. The first substrate 11 and the second substrate 16 are spaced apart from each other by a predetermined distance. The second substrate 16 including the electret material regions 15 is fixed. The first substrate 11 including the conductive surface regions 13 is coupled to a fixing structure 17 via springs 19. The spring 19 is connected to each side of the first substrate 11, and to the fixing structure 17. When the first substrate is displaced by an external force, the springs 19 can apply a restoring force to return the substrate to a certain position (to hold the substrate 11 in place). The presence of the spring 19 can cause the first substrate to reciprocate in the lateral direction (for example, in the horizontal direction in the drawing) and to return to the certain position.

The displacement of the first substrate 11 causes fluctuations in overlapped area between the electret material region 15 and the opposed conductive surface region 13, which results in a change in amount of charge on the conductive surface regions 13. The vibration power generator (electrostatic induction vibration power generator) 10 generates power by taking out the change in amount of charge as the electric energy.

A resonance frequency of vibration of the first substrate 11 is selected according to the frequency of the vibration to be used for power generation.

PRIOR ART DOCUMENTS

Patent Documents

JP 2005-529574 A

Non-Patent Documents

Non-Patent Document 1
T. Tsutsumino, Y. Suzuki and N. Kasagi,
"Electromechanical Modeling Of Micro Electret Generator For Energy Harvesting," TRNASUCERS & EURO SENSORS 2007, France, (2007), pp. 863-866

DISCLOSURE OF THE INVENTION

Problems to be Solved by the Invention

In the prior art, however, the vibration power generators disadvantageously have a small power output.

One embodiment of the invention provides a vibration power generator that has a larger power output and can be manufactured without needing any complicated structure and process. Another embodiment of the invention provides a vibration power generation apparatus using the vibration power generator, and an electronic device and a communication device with the vibration power generation apparatus mounted thereon.

Means for Solving the Problems

An embodiment of the present invention provides a vibration power generator including:
a first substrate;
a plurality of first electrodes disposed over one surface of the first substrate;
a second substrate spaced from the first substrate and opposed to the one surface of the first substrate with the first electrodes disposed thereover; and
a plurality of second electrodes disposed over one surface of the second substrate so as to be opposed to the first electrodes,
wherein one of the first electrode and the second electrode includes a film holding a charge,
one of the first substrate and the second substrate is vibratory with respect to the other,
while the vibratory substrate is displaced from the center of vibration to the end of vibration, an overlapped area between the first electrode and the second electrode viewed in the direction perpendicular to the surface of the first substrate changes at least one time in such a manner that the overlapped area becomes minimum and then increases to become maximum, or that the overlapped area becomes maximum and then decreases to become minimum,
an electrostatic capacity formed between the first electrode and the second electrode when the overlapped area between the first electrode and the second electrode becomes maximum (in which the specific electrostatic capacity is hereinafter referred to as an "electrostatic capacity Cp") changes while the vibratory substrate is displaced from the center of the vibration to the end of the vibration, and a change in electrostatic capacity Cp includes an increase in electrostatic capacity Cp.

Effects of the Invention

The vibration power generator according to one aspect of the invention can provide the larger power output.

EMBODIMENT OF THE INVENTION

Basis for Finding One Embodiment of the Invention

Figure 16:
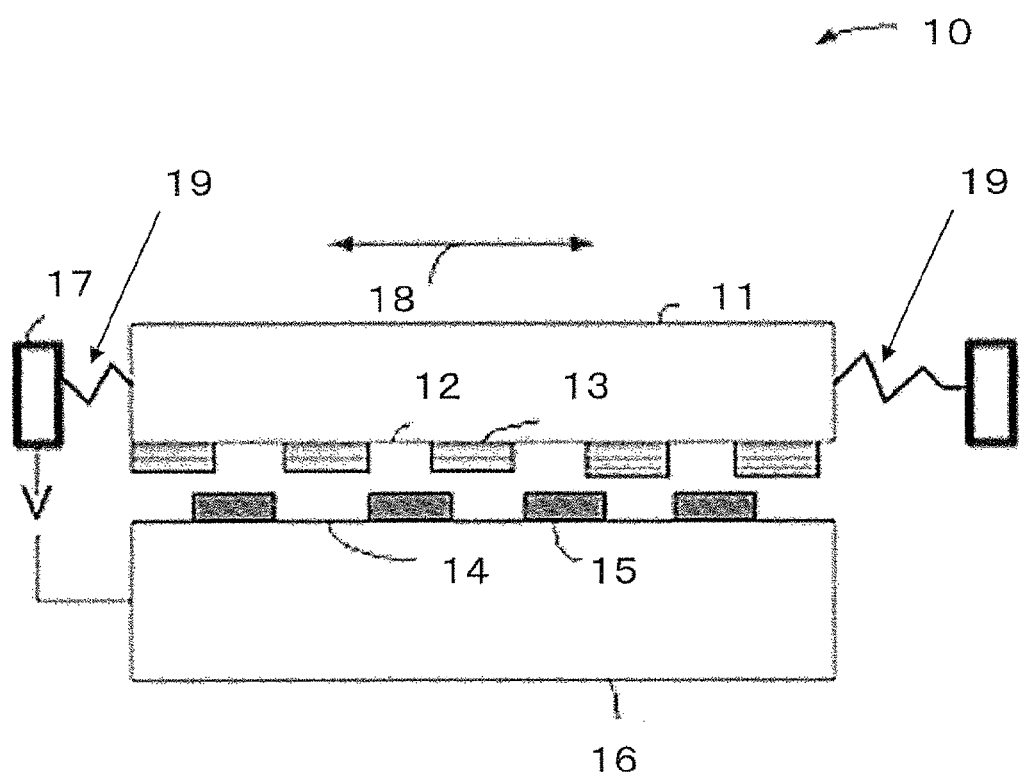
FIG. 16 is a cross-sectional view of a conventional electrostatic induction vibration power generator.

In the conventional vibration power generator 10 (see FIG. 16) disclosed in Patent Document 1, a plurality of electret material regions 15 and a plurality of conductive surface regions 13, each having the same size, are arranged at equal intervals. With this arrangement, when a first substrate 11 undergoes a simple harmonic vibration, the vibration power generator moves at different vibration velocities between the center of vibration and the end of the vibration (maximum vibration). The internal impedance of the vibration power generator 10 changes between the time when the first substrate 11 is positioned near the center of the vibration, and the time when the first substrate 11 is positioned at the end of the vibration.

Figure 17:
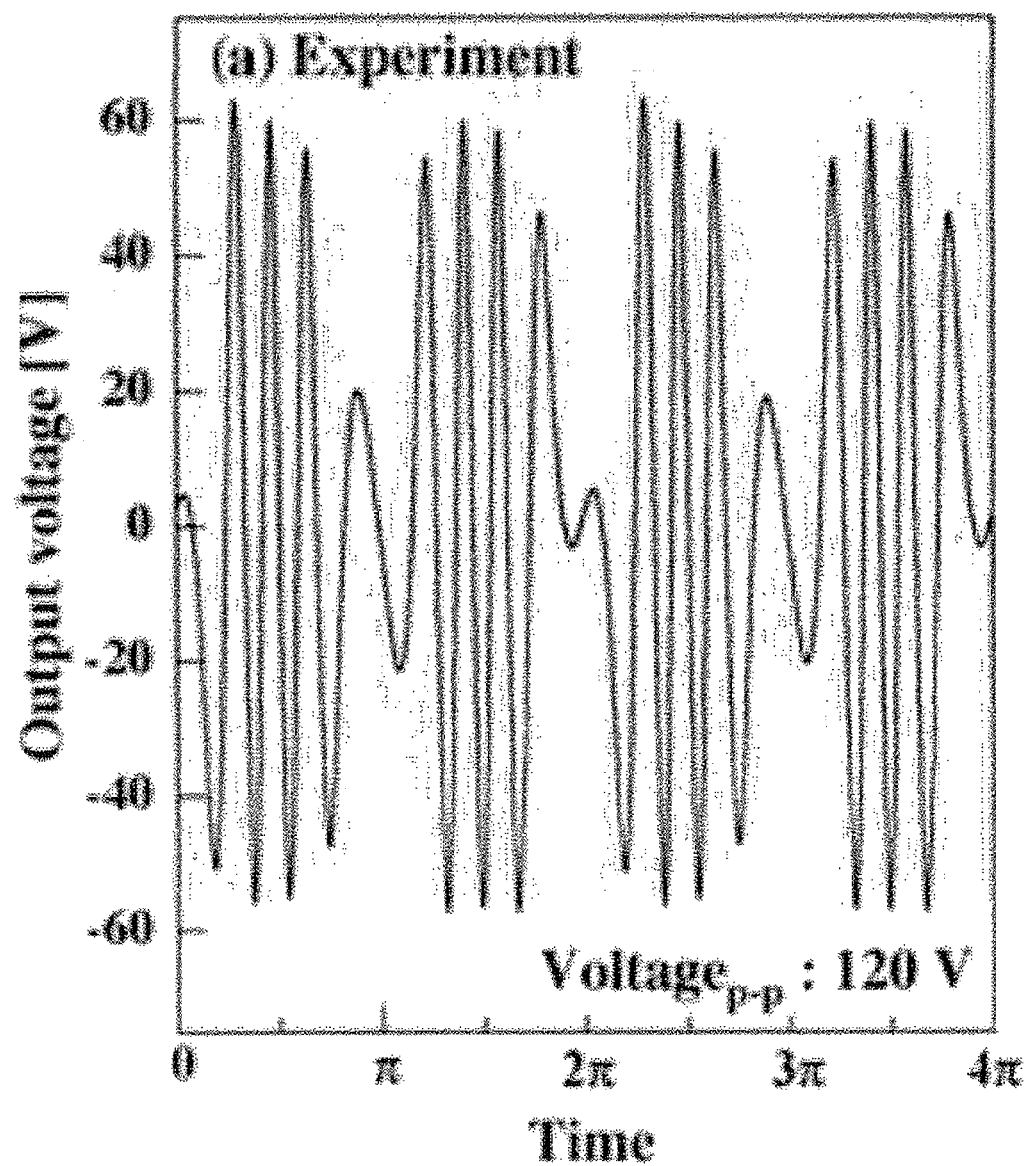
FIG. 17 is a diagram showing an output voltage waveform from the conventional electrostatic induction vibration power generator.

The inventors have found out that the change in internal impedance of the vibration power generator 10 largely changes the voltage output from the vibration power generator 10 during the vibration, which disadvantageously restricts the power that can be taken out as the generated power. FIG. 17 shows a waveform of an output voltage disclosed in Non-Patent Document 1. In FIG. 17, the amplitude of the output voltage drastically decreases when the time is substantially a multiple of $\pi$ ($\pi$, $2\pi$, $3\pi$).

The inventors have thought that the drastic decrease in output voltage is caused due to the change in internal impedance. That is, the inventors have found the problem that the change in internal impedance of the vibration power generator during vibration of the first substrate changes the voltage output from the vibration power generator. One embodiment of the present invention can be made to solve the above problem.

(First Aspect)

A first aspect is a vibration power generator including:

a first substrate;

a plurality of first electrodes disposed over one surface of the first substrate;

a second substrate spaced from the first substrate and opposed to the one surface of the first substrate with the first electrodes disposed thereover; and a plurality of second electrodes disposed over one surface of the second substrate so as to be opposed to the first electrodes, wherein one of the first electrode and the second electrode includes a film holding a charge, one of the first substrate and the second substrate is vibratory with respect to the other, while the vibratory substrate is displaced from the center of vibration to the end of vibration, an overlapped area between the first electrode and the second electrode viewed in the direction perpendicular to the surface of the first substrate changes at least one time in such a manner that the overlapped area becomes minimum and then increases to become maximum, or that the overlapped area becomes maximum and then decreases to become minimum, an electrostatic capacity formed between the first electrode and the second electrode when the overlapped area between the first electrode and the second electrode becomes maximum (the specific electrostatic capacity is hereinafter referred to as an "electrostatic capacity Cp") changes while the vibratory substrate is displaced from the center of the vibration to the end of the vibration, and the change in electrostatic capacity Cp includes an increase in electrostatic capacity Cp. The term "center of vibration" as used herein means the position of the vibratory substrate when the vibratory substrate is vibrating at an acceleration of zero (0).

In the first aspect of the invention, while the vibratory substrate is displacing from the center of vibration to near the end of vibration, the electrostatic capacity formed between the opposed electrodes is increased at least one time, which can reduce the change in internal impedance during the vibration of the vibratory substrate. Thus, in the above aspect of the invention, the change in output voltage caused by the change in internal impedance can be reduced to thereby produce the larger output power.

(Second Aspect)

A second aspect is the vibration power generator according to the first aspect, wherein the vibratory substrate is the first substrate, an overlapped area between the first electrode and the second electrode when the overlapped area between the first and second electrodes becomes maximum (the specific overlapped area is hereinafter referred to as an "overlapped area Ap") changes while the first substrate is displaced from the center of vibration to the end of vibration, and wherein the first and second electrodes are formed such that the change in overlapped area Ap includes an increase in overlapped area Ap. Thus, the first and second electrodes are formed in such a manner that the change in overlapped area Ap includes the increase in overlapped area Ap, which increases the electrostatic capacity Cp while the vibratory substrate is displaced from the center of vibration to the end of vibration.

(Third Aspect)

A third aspect is the vibration power generator according to the second aspect, wherein the first electrode and the second electrode have a rectangular shape as viewed in the direction perpendicular to the surface of the first substrate, the first electrodes have a certain width and a certain length, and the width and/or the length of the second electrode positioned in the center of the second substrate is smaller than the width and/or the length of one or more second electrodes positioned on the end side of the second substrate, in which a dimension of the electrode in a direction parallel to a vibrational direction of the first substrate is defined as the width of the electrode, and a dimension of the electrode in a direction perpendicular to the vibrational direction and parallel to the surface of the substrate with the electrodes formed thereover is defined as the length of the electrode.

In the third aspect, the overlapped area Ap can be reduced while the first substrate is displaced from the center of vibration to the end of vibration. The term "center of the second substrate" as used herein means an area of the second substrate opposed to the center of the first substrate in the vibrational direction when the first substrate is positioned in the center of vibration. The term "end of the second substrate" as used herein means the end of the second substrate in the vibration direction. The term "end side" as used herein means the side positioned closer to the end of the substrate as viewed from the center of the substrate.

(Fourth Aspect)

A fourth aspect is the vibration power generator according to the third aspect, wherein a plurality of third electrodes are further disposed between the second electrodes over the surface of the second substrate with the second electrodes formed thereover, each third electrode being comprised of a conductor of a rectangular shape as viewed in a direction perpendicular to the surface of the first substrate.

(Fifth Aspect)

A fifth aspect is the vibration power generator according to the first aspect, wherein the first electrode and the second electrode have a rectangular shape as viewed in the direction perpendicular to the surface of the first substrate, a plurality of third electrodes are further disposed between the second electrodes over a surface of the second substrate with the second electrodes formed thereover, each third electrode being comprised of a conductor of a rectangular shape as viewed in a direction perpendicular to the surface of the first substrate, and the width of the third electrode positioned in the center of the second substrate is larger than that of one or more third electrodes positioned on the end side of the second substrate.

Also, in the fifth aspect, the electrostatic capacity Cp increases while the vibratory substrate is displaced from the center of vibration to the end of vibration.

(Sixth Aspect)

A sixth aspect is the vibration power generator according to the first aspect, wherein the vibratory substrate is the first substrate and the respective surfaces of the first electrodes are positioned at the same distance from the surface of the first substrate, and a distance from the surface of the second electrode positioned in the center of the second substrate to the surface of the first electrode is larger than that from the surface of one or more second electrodes positioned on the end side of the second substrate to the surface of the first electrode.

Also, in the sixth aspect, while the first substrate is displaced from the center of vibration to the end of vibration, the electrostatic capacity Cp increases. This is because the electrostatic capacity Cp changes depending on a distance between the surface of the first electrode and the surface of the second electrode and Cp become larger as the distance is shorter. The distance between the surface of the first electrode and the surface of the second electrode can be changed by changing the thickness of the second substrate and/or second electrode.

(Seventh Aspect)

A seventh aspect is the vibration power generator according to the sixth aspect, wherein the thickness of the second substrate and/or the thickness of the second electrode is larger on the end side of the second substrate.

(Eighth Aspect)

An eighth aspect is a vibration power generation apparatus including:

the vibration power generator according to any one of the first to seventh aspects; and a rectifying circuit for rectifying an AC output voltage from the vibration power generator to convert the AC voltage into a DC voltage.

(Ninth Aspect)

A ninth aspect of the invention is the vibration power generation apparatus according to the eighth aspect which further includes:

a voltage conversion circuit for converting the DC voltage output from the rectifying circuit into a voltage at a predetermined voltage level;

a storage circuit for storing power generated by the vibration power generator when an output from the vibration power generation apparatus is unnecessary;

a voltage control circuit for controlling an output voltage from the voltage conversion circuit or the storage circuit to a predetermined voltage; and an output switching circuit for switching the output from the voltage conversion circuit to the storage circuit or the voltage control circuit.

(Tenth Aspect)

A tenth aspect is the vibration power generation apparatus according to the ninth aspect, wherein the output voltage from the voltage conversion circuit is set higher than the output voltage of the vibration power generation circuit.

(Eleventh Aspect)

An eleventh aspect of the invention is a communication device using the vibration power generation apparatus according to any one of the eighth to tenth aspects.

(Twelfth Aspect)

A twelfth aspect of the invention is a communication device including the vibration power generator according to any one of the first to seventh aspects, and a battery.

(Thirteenth Aspect)

A thirteenth aspect is an electronic device using the vibration power generation apparatus according to any one of the eighth to tenth aspects.

(Fourteenth Aspect)

A fourteenth aspect is an electronic device including the vibration power generator according to any one of the first to seventh aspects, and a battery.

Embodiments of the present invention will be described in detail below with reference to the accompanying drawings. In the following description, terms indicative of specific directions and positions (for example, the terms "upper", "lower", "left", "right", and other terms including these words) are used if necessary. These words are used only for easy understanding of the invention referring to the drawings, and are construed to have no meanings to limit the technical scope of the invention. The same or equivalent parts or members in the drawings are indicated by the same reference numerals in the drawings.

1. First Embodiment

Structure

Figure 1:
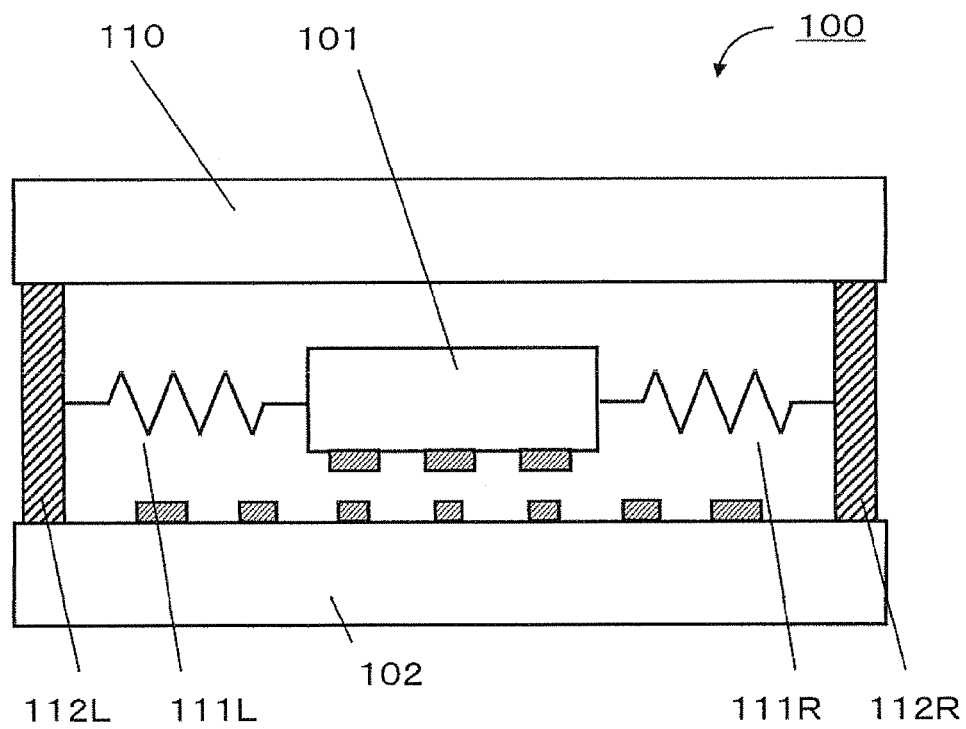
In FIG. 1, (a) is a cross-sectional view of a vibration power generator of the first embodiment with a first substrate positioned in the center of vibration and (b) is a cross-sectional view of the vibration power generator of the first embodiment with the first substrate displaced to the maximum displacement position.
Figure 1:
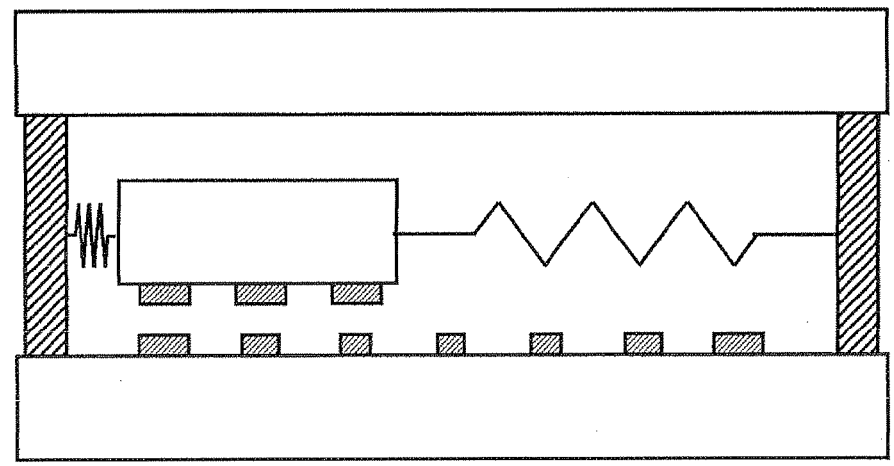
Figure 1:
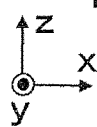
Figure 2:
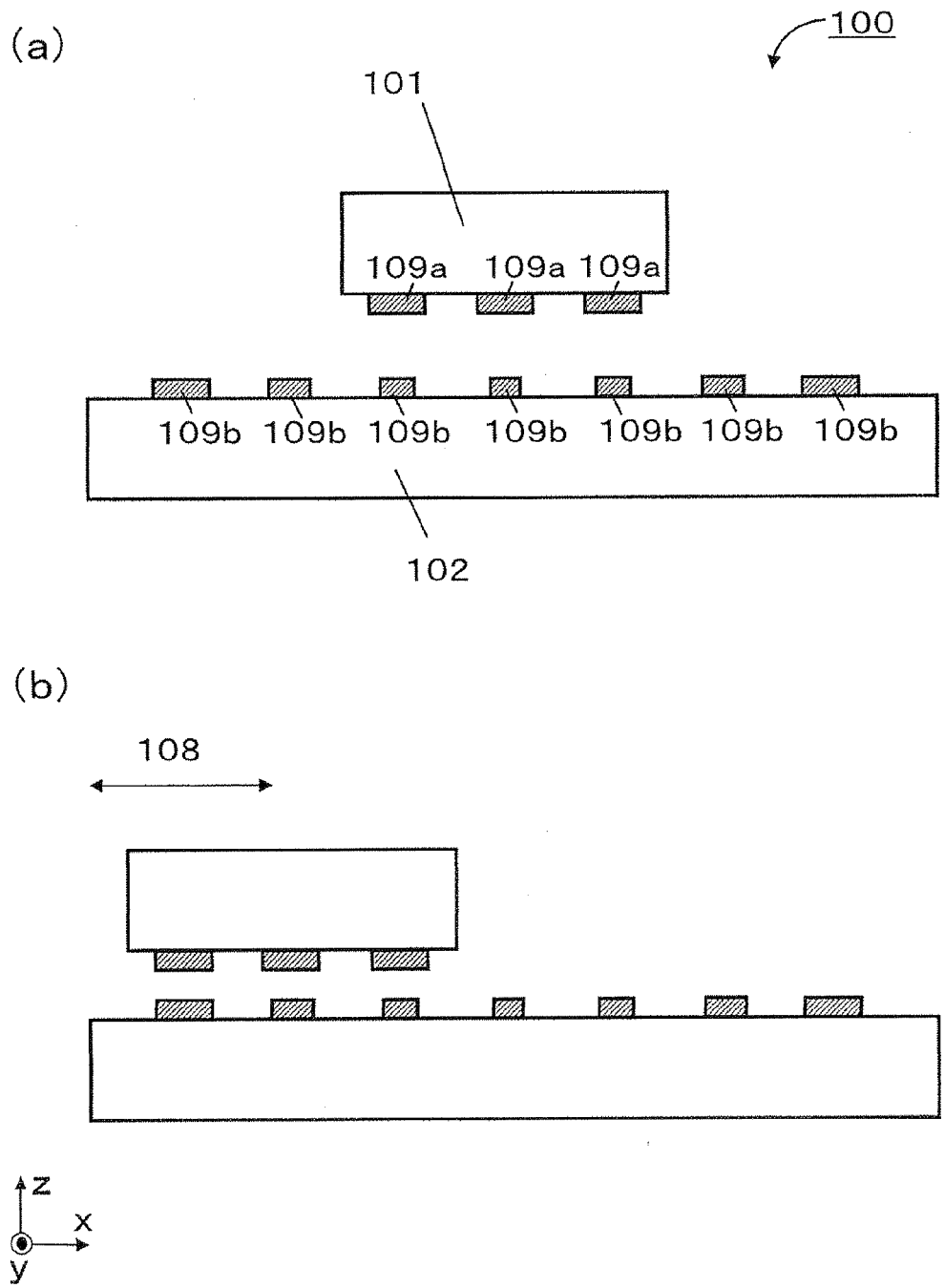
In FIG. 2, (a) is a cross-sectional view of a part of the vibration power generator shown in FIG. 1 and contributing to the power generation with the first substrate positioned in the center of vibration and (b) is a cross-sectional view of the part of the vibration power generator shown in FIG. 1 and contributing to the power generation with the first substrate displaced to the maximum displacement position.
Figure 3:
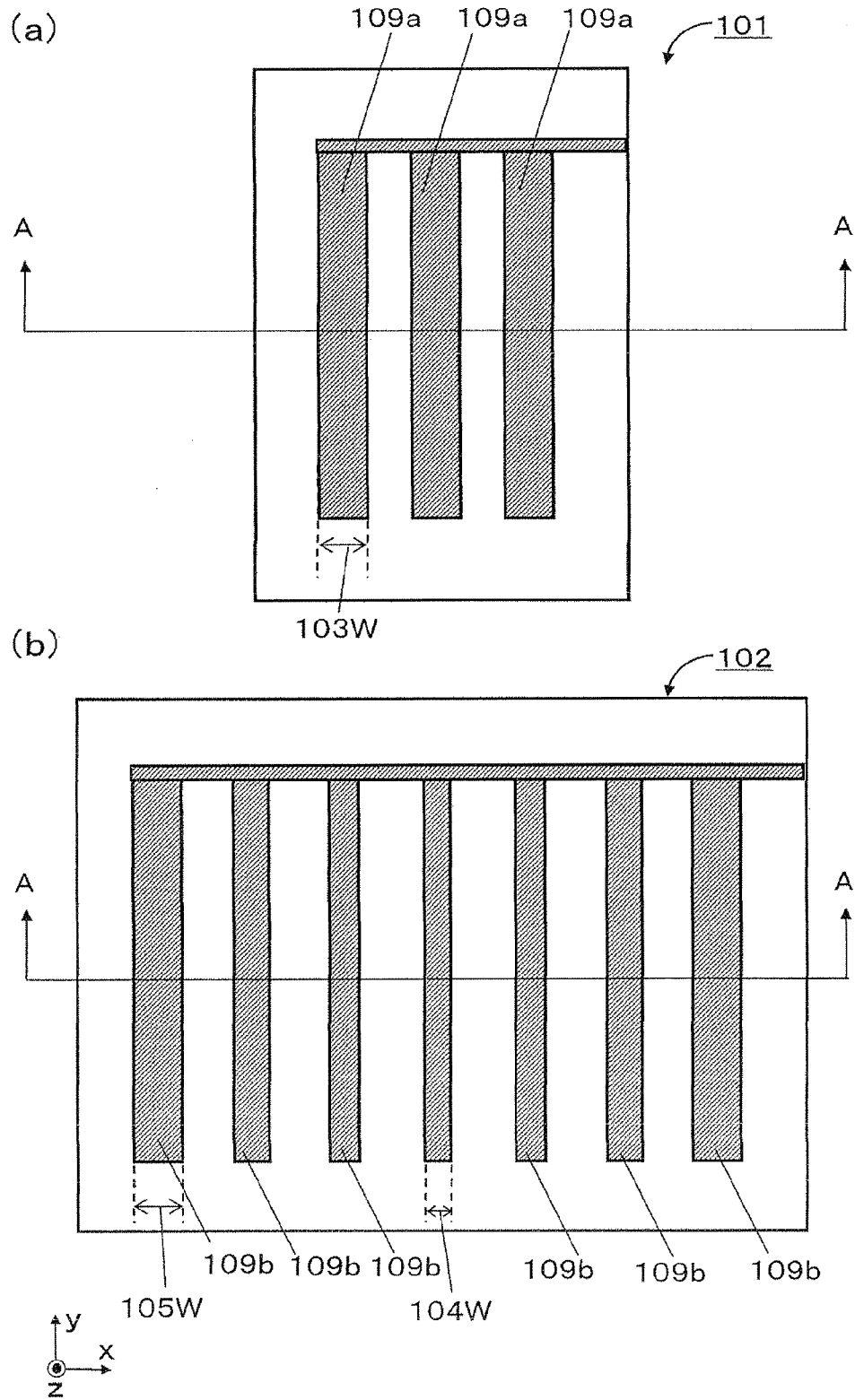
In FIG. 3, (a) is a plan view showing an electrode formation surface and first electrodes on the first substrate of the vibration power generator according to the first embodiment and (b) is a plan view showing an electrode formation surface and second electrodes on a second substrate of the vibration power generator according to the first embodiment.

FIG. 1 shows cross-sectional views of a vibration power generator 100 according to a first embodiment of the invention. FIG. 2 shows cross-sectional views of a part of the vibration power generator 100 of FIG. 1 contributing to the power generation. FIG. 3 shows plan views of a substrate surface and electrodes illustrating an electrode structure of the vibration power generator 100 shown in FIG. 1. For easy understanding, FIGS. 1 and 2 omit the illustration of a wiring structure. The cross-sectional views described in not only this embodiment, but also other embodiments are those taken along the line parallel to the vibration direction of the vibratory substrate (first substrate) and thickness direction of the substrate.

The vibration power generator 100 includes a first substrate 101, a second substrate 102 opposed to one surface of the first substrate 101 (lower surface of the first substrate 101 in FIG. 1), and a third substrate 110 opposed to the other surface of the first substrate 101 (upper surface of the first substrate 101 in FIG. 1). The second substrate 102 and the third substrate 110 are connected by supporters 112L and 112R. The first substrate 101 is connected to the supporters 112L and 112R by elastic springs 111L and 111R, respectively. That is, the first substrate 101 is fixed via the elastic springs. The vibration power generator structure shown in FIG. 1(*a*) has the first substrate 101 movable in the direction of the X axis (in the lateral direction in FIG. 1) as shown in FIG. 1(*b*).

The positional relationship between the electrodes will be described below using FIG. 2.

A plurality of first electrodes 109*a* are formed over one principal surface of the first substrate 101 (lower surface of the first substrate 101 in FIG. 2). A plurality of second electrodes 109*b* are disposed at the respective positions opposed to the first electrodes 109*a* over a principal surface of the second substrate 102 opposed to the first substrate 101 (upper surface of the second substrate in FIG. 2). Either the first electrode 109*a* or the second electrode 109*b* is an electret electrode including a film holding a charge. Taking into consideration the charging stability of the electret materials, in the embodiment shown, uniform charging can be achieved when, for example, each first electrode 109*a* with a constant width is the electret electrode.

(Electrode)

Next, the shape, size, and arrangement of the electrodes will be described below.

FIG. 3 includes plan views showing the first substrate 101, the first electrodes 109*a* formed over the surface of the first substrate, the second substrate 102, and the second electrodes 109*b* formed over the surface of the second substrate. FIGS. 1 and 2 correspond to cross-sectional views taken along the line A-A of the first substrate 101 and the second substrate 102 of FIG. 3. In the following description, the dimension of the electrode in the direction X (vibrational direction) is referred to as the "width", and the dimension of the electrode in the direction Y is referred to as the "length".

As shown in FIG. 3, the first electrodes 109*a* are of a rectangular (strip-like) shape with the same width 103W and length, and arranged at equal intervals in the vibrational direction (or in the direction x). In the embodiment shown, the center-to-center spacing between the adjacent two electrodes in the vibrational direction (hereinafter referred to as a "pitch") corresponds to a distance between the centers of the electrodes in the vibrational direction (distance between the center lines, each line separating the electrode into two equal parts in the width direction). In contrast, the second electrodes 109b are also arranged at an equal pitch in the vibrational direction. However, the second electrode 109b located in the center of the second substrate 102 has the smallest width. The second electrode located closer to the end of the second substrate 102 (the end in the vibrational direction) has the larger width. That is, a distance between the second electrodes 109b (that is, a distance between the ends of the electrodes in the vibrational direction) positioned closer to the center of the second substrate 102 becomes wider. The distance between the second electrodes positioned closer to the end of the second substrate 102 (end in the vibrational direction) becomes narrower.

More specifically, the second electrodes 109b do not have the constant width. The second electrode 109b positioned closer to the end of the second substrate 102 has a larger width. Thus, as shown in FIG. 3(b), the electrode width 104W positioned near the center of the substrate is smaller than the electrode width 105W positioned near the end of the substrate. In the case where the second electrodes have different widths in this way and the first electrodes 109a hold the same charge, the Cp provided when the first substrate 101 is disposed near the maximum displacement position (where the vibration velocity is minimum) can differ from the Cp when the first substrate 101 is positioned near the center of vibration (where the vibration velocity is maximum), which can suppress the change in internal impedance.

The term "Cp" indicates an electrostatic capacity formed between the first electrode 109a and the second electrode 109b when the overlapped area between the first electrode 109a and the second electrode 109b becomes maximum as mentioned above. The electrostatic capacity Cp can be referred to as a "maximum capacity". As shown in the drawing, the distance between the first electrodes 109a is equal to the width of the first electrode 109a, and the first substrate 101 vibrates with 8 times larger amplitude than the width of the first electrode 109a. This case will be described below. The overlapped area between the first electrode 109a and the second electrode 109b becomes maximum when the first substrate 101 is positioned at the center of vibration. The overlapped area becomes minimum (for example, zero) twice and maximum twice while the first substrate 101 is displaced from the center of the vibration to one vibration end. In the embodiment shown, the overlapped area between the first electrode 109a and the second electrode 109b becomes maximum when the center of the first electrode 109a in the vibrational direction is superimposed on the center of the second electrode 109b in the vibrational direction as viewed in the direction perpendicular to the principal surface of the substrate. The overlapped area at this time is referred to as an "Ap" in the present specification.

In the first embodiment, the width 104W of the second electrode positioned in the center of the second substrate is different from the width 105W of another second electrode positioned at the end of the second substrate. That is, the following formula is satisfied: 105W>104W. Thus, the Ap obtained when the first substrate 101 is located at the center of the vibration (see FIG. 2(a)) is smaller than the Ap obtained when the first substrate 101 is displaced to the maximum displacement position from the center of the vibration (see FIG. 2(b)). Together with this, the Cp obtained when the first substrate 101 is positioned at the center of the vibration is smaller than the Cp obtained when the first substrate is displaced to the maximum displacement position from the center of the vibration.

In the first embodiment, the second electrode 109b positioned closer to the end of the second substrate 102 has a larger width. While the first substrate 101 vibrates at four times larger amplitude than the width of the first electrode 109a, the Ap changes (increases) and thus the Cp increases even when the first substrate 101 is displaced, for example, leftward by a distance twice longer than the width of the first electrode 109a from the center of the vibration.

(Electret Electrode)

Figure 20:
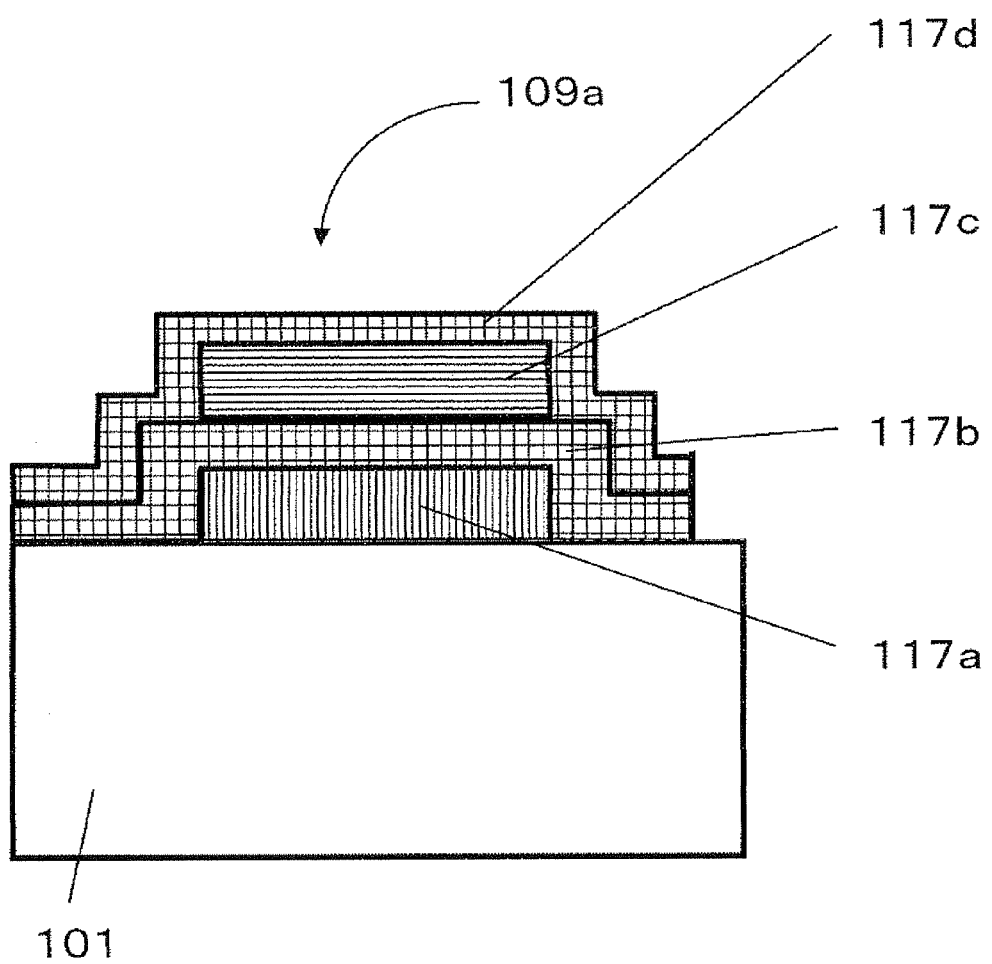
FIG. 20 is a cross-sectional view of an electret electrode in the vibration power generator in the first embodiment.

Next, an electret electrode containing a film holding the charge will be described using FIG. 20. FIG. 20 is a cross-sectional view of the electret electrode.

FIG. 20 shows that the electret electrode is formed over the first substrate 101 assuming that the first electrode 109a is the electret electrode. As shown in FIG. 20, a conductor 117a is formed over the substrate 101. A first insulator 117b, an electret 117c serving as a film holding a charge, and a second insulator 117d are formed over the conductor 117a.

When a plurality of electret electrodes are formed, the conductor 117a of each electret electrode is electrically connected. The electret 117c may be formed over the entire conductor 117a (that is, the electret may have a size equal to or larger than that of the conductor). Alternatively, the electret 117c may be disposed over only a part of the strip-shaped conductor 117a. The electret 117c is formed over the part of the strip-shaped conductor 117a (that is, the width of the electret 117c is smaller than that of the conductor 117a), which is advantageous in terms of stability of the process and device characteristics.

In particular, when the first substrate 101 is formed of a substrate having a high resistance, the electret 117c may be formed over only the conductor 117a. This is because, upon implanting a charge, the charge can be forcedly implanted into the electret 117c to thereby produce the electret with stable charges.

Next, the electret material will be described below. As an electret material for constituting the electret, a polymer material, such as polypropylene, polyester terephthalate, or polyvinyl chloride, or an inorganic material, such as silicon oxide. Among them, an inorganic material with excellent dielectric voltage and heat resistance, such as a silicon oxide, is advantageously used.

In order to improve the humidity resistance of the electret, the electret has its surroundings completely covered with an insulating film (second insulator 117d), such as a silicon nitride film. For example, in use of silicon oxide as the electret material, the insulating film, such as a silicon nitride film, completely covers the surroundings of the silicon oxide, which can provide the electret 117c with excellent dielectric voltage, heat resistance, and humidity resistance. The insulating film is disposed between the conductor 117a and the electret 117c (which is the first insulator 117b as shown in FIG. 20). The first insulator 117b is provided for insulating the conductor 117a from the electret 117c to prevent the charge held by the electret from transferring to the conductor. The first insulator 117b may be formed of the same material as that of the second insulator 117d.

(Operation)

Next, the operation of the vibration power generator 100 will be described below.

In the vibration power generator structure shown in this embodiment as described above, the first substrate 101 is displaced by action (vibration) from the outside. The repulsion of the elastic springs 111L and 111R displaces the first substrate 101 in the direction in which the substrate is returned to a desired position. When the action from the outside is stopped, the vibration is damped to stop the first substrate 101. As long as the action from the outside continues, the first substrate 101 continues to vibrate. The displacement of the first substrate 101 changes the overlapped area between the first electrode 109a and the second electrode 109b, causing a change in charge on the surface of the electrode other than the electret electrode. The vibration power generator 100 uses the change in charge to generate power.

(Effects)

Figure 21:
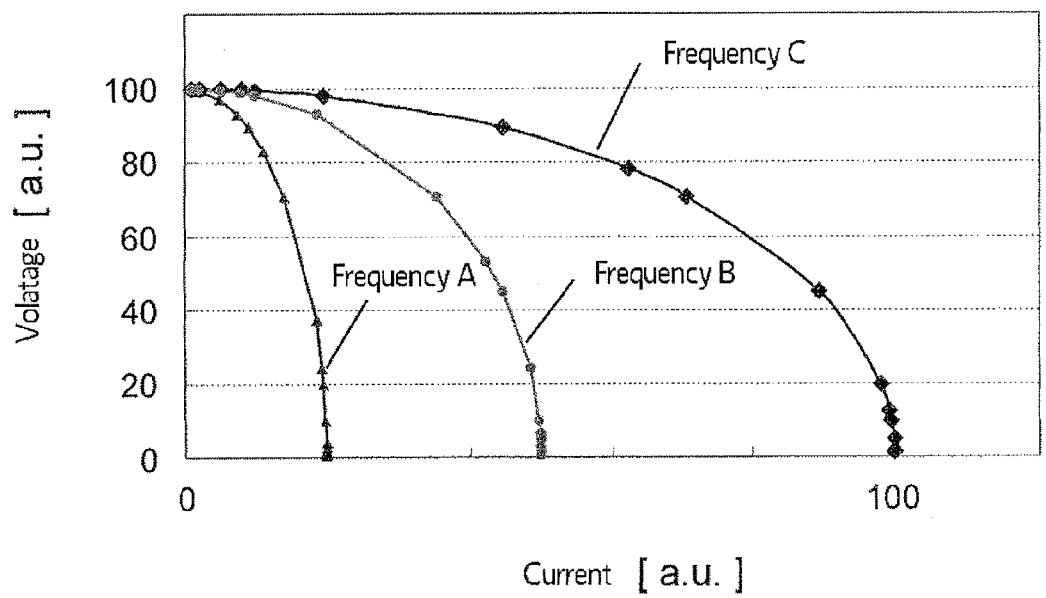
FIG. 21 is a graph showing the relationship between output currents and output voltages at three frequencies of the vibration power generator.

The vibration power generator 100 according to the first embodiment can have the following effects:

(1) Large power output (power that can be taken out)
(2) Reduction in loss at circuit
(3) Reduction in load on circuit The detailed description as to (1) will be made below. The vibration power generator of this embodiment can take out the electric energy by a change in electrostatic capacity formed by the first electrode 109a and the second electrode 109b opposed to each other as described above. The internal impedance of the vibration power generator 100 is capacitative. Thus, when the frequency at which the number of the electrodes fluctuates by vibration is changed, the internal impedance will be changed. FIG. 21 shows the output voltage-current characteristics of the vibration power generator when the vibration frequency is changed.

FIG. 21 shows the current-voltage characteristics when the vibration frequencies are A, B, and C (note that at the frequency C, the maximum output is aligned with the load, and at the frequencies A and B, the maximum output is not aligned) in the conventional vibration power generator. Referring to FIG. 21, when an output current from the vibration power generator becomes zero (open load), the output voltage is maximized. In contrast, when the output voltage becomes zero (short load), the output current is maximized. That is, the vibration power generator increases or decreases the output power based on the relationship with the load.

The vibrational velocity obtained when the first substrate is located in the center of the vibration is larger than a vibration velocity obtained when the first substrate is displaced to the maximum displacement position. That is, the vibration frequency of the first substrate when the substrate is positioned in the center of vibration is larger than that of the first substrate when the substrate is displaced to the maximum displacement position. When the external load is constant, the output voltage is changed according to the vibrational velocity (that is, position) of the first substrate based on FIG. 21. In the first embodiment, the width of the second electrode positioned in the center of the second substrate is decreased, and the width of the second electrode positioned near the end of the second substrate is increased, which changes the electrostatic capacity Cp. The internal impedance of the vibration power generator 100 is determined by the electrostatic capacity Cp and the vibration frequency of the vibratory substrate. The electrostatic capacity Cp is changed together with the change in vibration frequency of the first substrate 101, which can suppress the change in internal impedance. As a result, the change in output voltage due to the change in internal impedance is suppressed, so that the output voltage can be kept substantially constant until the amount of displacement of the first substrate 101 approaches the maximum amplitude.

The voltage output from the vibration power generator 100 of the first embodiment can be kept substantially constant until the amount of displacement of the first substrate 101 approaches the maximum amplitude. This can increase the output power. For example, in the vibration power generator from which the voltage shown in FIG. 17 can be obtained, the circuit is designed to take out a voltage of 80 V (in a range of −40 V to +40 V). In this case, a voltage obtained when the amount of displacement of the vibratory substrate is near the maximum amplitude is normally low (for example, about 40 V). Thus, the voltage at which the amount of displacement of the vibratory substrate is near the maximum amplitude is cut as a loss by a rectifying circuit or the like. However, in the vibration power generator 100 of the first embodiment, by changing the electrostatic capacity at the center of the vibration and at the maximum amplitude, the output voltage can be set to about 80 V even when the amount of displacement of the vibratory substrate is substantially the maximum amplitude. The output voltage can be used for power generation. In this way, the output power can be increased.

Next, the detailed description as to (2) will be made below. In the vibration power generator 100 of this embodiment, the first electrode 109a and the second electrode 109b are formed such that the maximum capacity formed by the first electrode 109a and the second electrode 109b obtained when the first substrate 101 is located in the center of the vibration differs from that obtained when the first substrate 101 is located at the end of the vibration, whereby the internal impedance of the vibration power generator 100 is prevented from being deviated from a designed value during the operation. Thus, the impedance matching can be easily kept between the vibration power generator 100 and the load to thereby increase a range of the output voltage during the operation of the vibration power generator 100. As a result, this embodiment can also utilize the output voltage obtained when the vibratory substrate is displaced to near the end of the vibration, which is cut as a loss upon rectification in the conventional vibration power generator. Thus, this embodiment can reduce the loss in voltage of the whole power generator.

The detailed description as to (3) will be made below. In the vibration power generator 100 of this embodiment, the first electrode 109b and the second electrode 109a are formed such that the maximum capacity obtained when the first substrate 101 is located in the center of the vibration differs from that obtained when the first substrate 101 is located at the end of the vibration. Thus, a change in output voltage while the first substrate 101 is vibrating can be reduced as a whole. That is, for example, when the voltage taken out is set to from +40 V to −40 V, a peak of a voltage exceeding 40 V can be decreased. This is because, as shown in FIG. 3(b), the width 105W is identical to the width 103W of the first electrode, and the width 104W is smaller than the width 105W. The degree by which the breakdown voltage of the circuit is larger than the desired voltage (voltage taken out) can be reduced as compared to that obtained when all second electrodes have the same width. In the related art, the voltage exceeding 40 V (or −40 V) becomes loss so that the power is wasted as heat as described above. However, this embodiment can reduce the wasted power and therefore can reduce the load on the circuit.

As shown in the drawings, in the first embodiment, the second electrodes 109b are also formed in such a region that exceeds the first electrodes 109a (outside the area defined by the first electrodes 109a). Alternatively, in a modified example, the second electrodes 109b are formed up to the position of the limit of vibration (within a range of vibration displacement) of the first substrate 101 (especially, the first electrodes 109a).

This arrangement can provide the following effects.

(4) Power generation available in maximum displacement position

If the second electrodes 109b are formed only in positions substantially opposed to the first electrodes 109a with the first substrate 101 remaining stationary (so that the number of the first electrodes is the same as that of the second electrodes), the following phenomenon will occur. Specifically, the large vibration amplitude (large displacement) of the first substrate 101 will increase the period of time during which the first electrodes 109a (especially, the first electrodes located at the end of the substrate) are not overlapped over the second electrodes 109b, and will decrease the amount of power generation. In the case where the second electrodes 109b are formed to cover the region exceeding the first electrodes 109a (that is, the second electrodes 109b are formed outside the first electrodes 109a, and the number of second electrodes 109b> the number of first electrodes 109a is satisfied), the time during which the electrodes are not overlapped over each other is eliminated, thereby suppressing the decrease in amount of power generation. That is, the amount of power generated by the vibration power generator 100 can be stabilized.

Such an arrangement of the second electrodes 109b can be expected to increase, especially, the amplitude of the first substrate 101. The above effect (4) can be more effectively exhibited in the vibration power generator in which the first substrate 101 vibrates at a large amplitude (for example, at such an amplitude that allows the overlapped area between the first and second electrodes 109a and 109b to become minimum twice or more times while the first substrate 101 is displaced from the center of vibration up to one end of the amplitude).

The shape of the surface (principal surface) of the first substrate 101 is not limited to the rectangular one shown in the drawing, and may be square or other shapes. The same goes for the shape of the surface of the second substrate 102.

In the embodiment shown, the second electrode positioned closer to the end of the substrate has a larger width. In modification, for example, only the second electrodes positioned at both ends of the substrate have the larger width. In another modified example, a group 1 of the second electrodes with a width W1, another group 2 of the second electrodes with a width W2, and a further group 3 of the second electrodes with a width W3, wherein W1<W2<W3 is satisfied, may be arranged from the center of the second substrate to each end thereof in that order.

2. Second Embodiment

Figure 4:
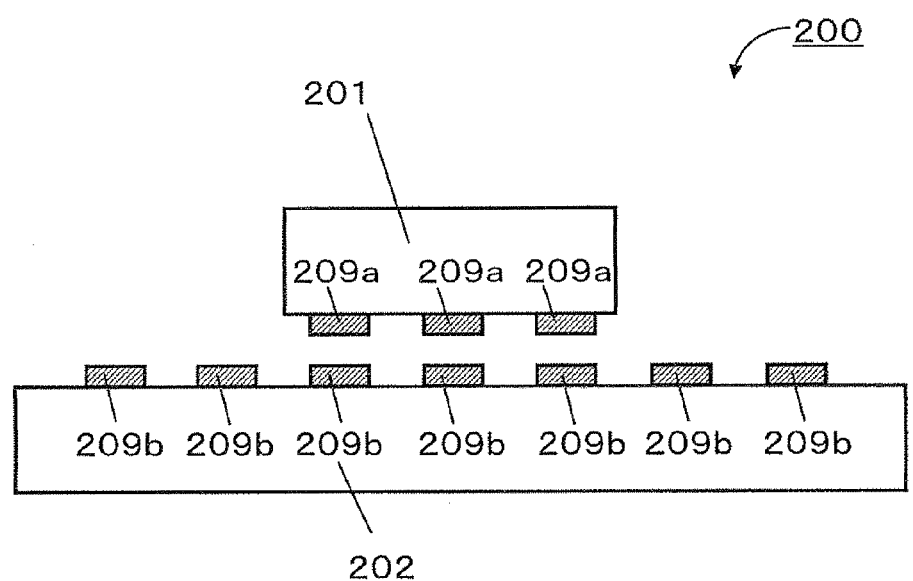
In FIG. 4, (a) is a cross-sectional view of a part of the vibration power generator contributing to the vibration with the first substrate positioned in the center of vibration according to a second embodiment of the invention and (b) is a cross-sectional view of the part of the vibration power generator contributing to the vibration with the first substrate displaced to the maximum displacement position according to the second embodiment.
Figure 4:
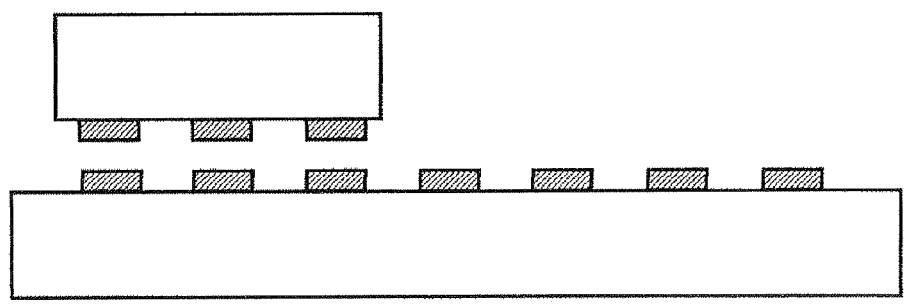
Figure 4:
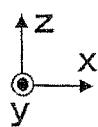
Figure 5:
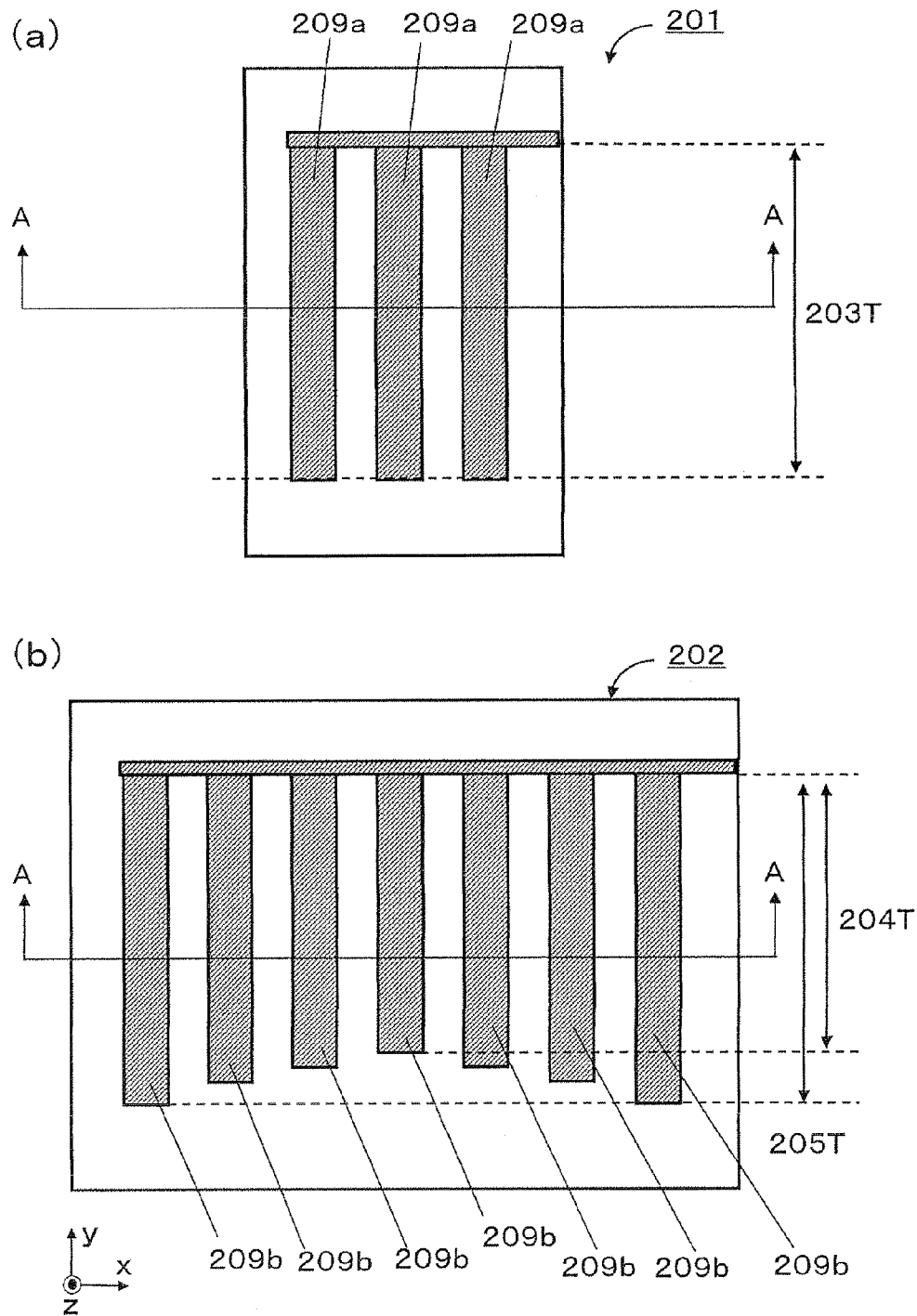
In FIG. 5, (a) is a plan view showing an electrode formation surface and first electrodes on the first substrate of the vibration power generator according to the second embodiment and (b) is a plan view showing an electrode formation surface and second electrodes on a second substrate of the vibration power generator according to the second embodiment.

FIG. 4 includes cross-sectional views of a part of a vibration power generator 200 according to a second embodiment, which part contributes to the power generation. FIGS. 5A and 5B are plan views respectively showing the shape and dimension of the first electrode 209a and the second electrode 209b. For easy understanding, FIGS. 4 and 5 omit the illustration of a wiring structure. The vibration power generator 200 shown in FIG. 4 is the same as the vibration power generator 100 shown in FIG. 1 except for the part contributing to the power generation.

The second embodiment is different from the first embodiment in the following points. The second electrodes 209b have the same width, and the first electrodes 209a have the same length 203T. And, the second electrode 209b located closer to the center of the second substrate 202 differs in length from the second electrode 209b located at the end of the substrate. Specifically, in the second embodiment, the length 204T of the second electrode at the center of the second substrate 202 differs from the length 205T of the second electrode at the end of the second substrate 202, that is, 205T>204T. Accordingly, the Ap obtained when the first substrate 201 is positioned at the center of vibration (see FIG. 4(a)) is smaller than the Ap obtained when the first substrate 201 is displaced to the maximum displacement position from the center of vibration (see FIG. 4(b)). Together with this, the Cp obtained when the first substrate 201 is positioned at the center of vibration is smaller than the Cp obtained when the first substrate 201 is displaced to the maximum displacement position from the center of vibration. The operation or the like of the vibration power generator 200 in the second embodiment is the same as that in the first embodiment.

The vibration power generator 200 according to this embodiment can obtain the following effects in addition to the effects described in the first embodiment.

(5) Easy attainment of uniform power generation amount in plane

Next, the detailed description as to (5) will be made below. The vibration power generator 200 shown in this embodiment has the second electrodes 209b with the same width as mentioned above. In the embodiment shown, when the first substrate 201 is displaced by the width of the second electrode (=width of the first electrode), the overlapped area between the first electrode and the second electrode becomes zero (or minimum), causing a change in capacity for power generation. The change in capacity is the same between each first electrode and each second electrode in the whole plane. Thus, in the vibration power generator of the second embodiment, as long as the amount of displacement of the first substrate is the same even when the first substrate is located in the center of vibration or at the end of vibration, the change in capacity in the plane of the power generator becomes uniform.

In contrast, for example, in the vibration power generator similar to that of the first embodiment, when the width of the second electrode positioned at the end of the second substrate is larger than that of the first electrode, the amount of displacement of the first substrate required for power generation differs between the center and the end of the second substrate. For example, when the first substrate is displaced by the width of the second electrode positioned in the center of the second substrate, the overlapped area between the first electrode and the second electrode near the end of the second substrate does not become zero (or minimum). As a result, the amount of power generation at the end may be decreased.

That is, the second electrodes each have the constant certain width in the vibration power generator of this embodiment. Thus, the amount of displacement of the first substrate required for power generation in the center of the second substrate is the same as that at the end of the second substrate in the entire plane of the vibration power generator, which tends to give the uniform amount of power generation. This is effective when the amplitude of the first substrate is small. When the amount of displacement of the first substrate required for power generation is uniform in plane, design of the vibration power generator is facilitated.

In the embodiment shown, the second electrode positioned closer to the end of the substrate has a larger length. In a modified example, for example, only the second electrodes positioned at both ends of the substrate have the larger length. In another modified example, a group 1 of the second electrodes with a length T1, another group 2 of the second electrodes with a length T2, and a further group 3 of the second electrodes with a length T3, wherein T1<T2<T3 is satisfied, may be arranged from the center of the second substrate to each end thereof in that order.

3. Third Embodiment

Figure 6:
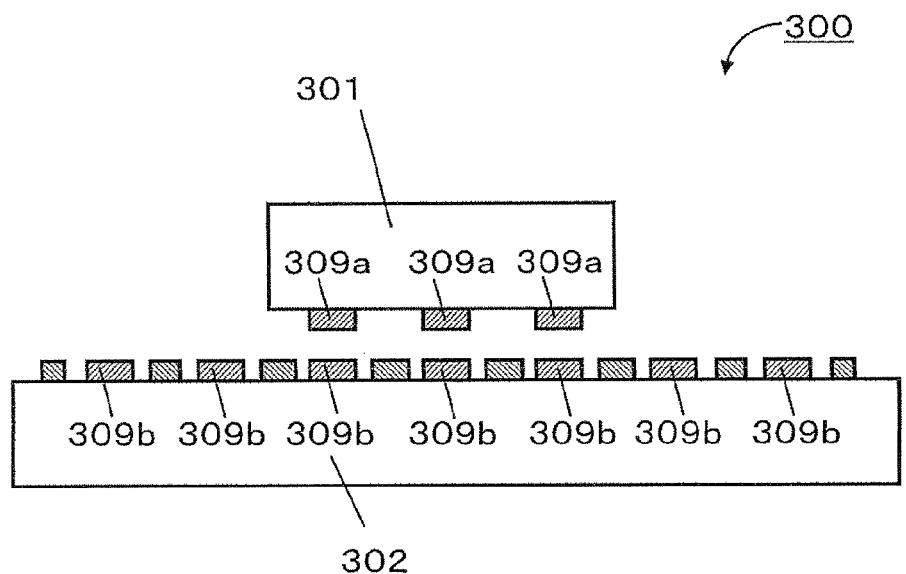
In FIG. 6, (a) is a cross-sectional view of a part of the vibration power generator contributing to the vibration with a first substrate positioned in the center of vibration according to a third embodiment and (b) is a cross-sectional view of the part of the vibration power generator contributing to the vibration with the first substrate displaced to the maximum displacement position in the third embodiment.
Figure 6:
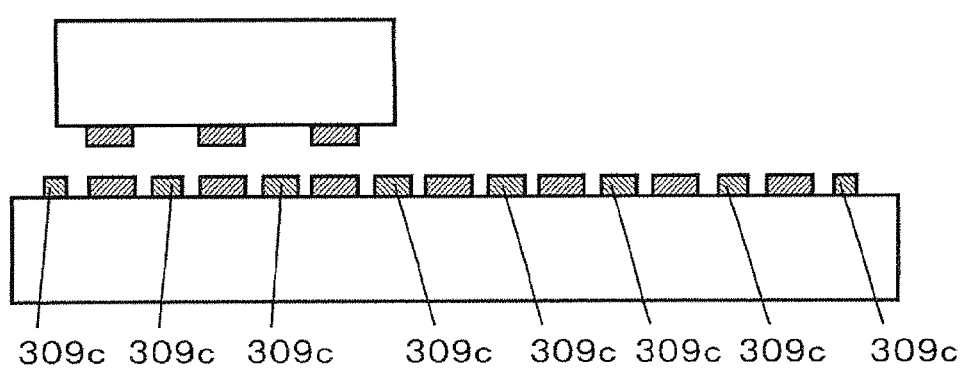
Figure 6:
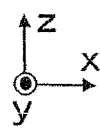
Figure 7:
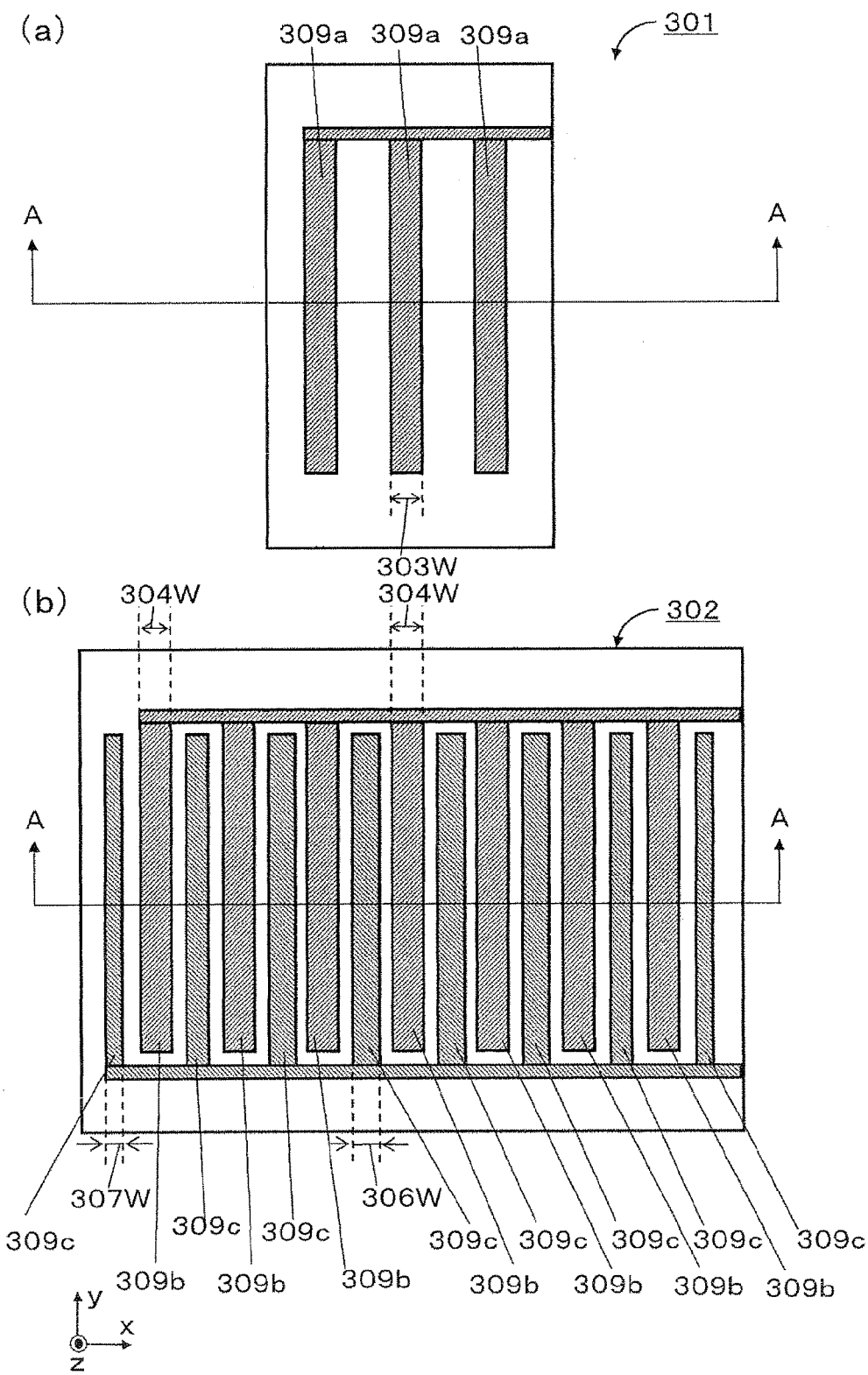
In FIG. 7, (a) is a plan view showing an electrode formation surface and first electrodes on the first substrate of the vibration power generator according to the third embodiment and (b) is a plan view showing an electrode formation surface and second and third electrodes on a second substrate of the vibration power generator according to the third embodiment.

FIG. 6 includes a cross-sectional views of a part of a vibration power generator 300 according to a third embodiment, which part contributes to power generation. FIGS. 7(a) and 7(b) show plan views of the shapes and dimensions of a first electrode 309a, a second electrode 309b, and a third electrode 309c. For easy understanding, FIGS. 6 and 7 omit the illustration of a wiring structure. Parts of the vibration power generator 300 shown in FIG. 6 other than the part contributing to vibration are the same as those of the vibration power generator 100 shown in FIG. 1.

The third embodiment differs from the first and second embodiments in that the width and length of the second electrodes 309b are constant, and that the third electrodes 309c composed of conductors are positioned over the surface of the second substrate 302 between the second electrodes 309b. The width of the third electrode 309c positioned in the center of the second substrate 302 is different from the width of the third electrode 309c positioned at the end of the second substrate 302. Thus, the vibration power generator 300 can suppress the change in internal impedance while the first substrate 301 is vibrating. The operation and the like of this embodiment are the same as those of the first embodiment.

The third electrode 309c is formed of a conductor, and grounded to GND in use. The third electrode 309c can be called a guard electrode. In the third embodiment, either the first electrode 309a or the second electrode 309b may be the electret electrode. When the first electrode 309a is the electret electrode, the second electrode 309b and the third electrode 309c can be formed in one step. When the second electrode 309b is the electret electrode, the electric field leaking in the lateral direction to be described later is more pulled into the third electrode 309c as compared to the case where the first electrode 309a is the electret electrode.

The case where the second electrode 309b is the electret electrode will be described below.

The vibration power generator 300 according to this embodiment can obtain the following effects, in addition to the effect described in the first embodiment.

(6) Prevention of reduction in rate of change in capacity
(7) Increase in amount of power generation The detailed description as to (6) will be made below. Assuming that the electrostatic capacity Cp obtained when the overlapped area between the first electrode 309a and the second electrode 309b is maximized is 100, the capacity obtained when the first electrode is not overlapped over the second electrode at all does not become zero. This is because the electric field is generated laterally from the second electrode 309b to thereby form the capacity between the first and second electrodes 309a and 309b even when the first electrode is not overlapped over the second electrode. The output voltage of the vibration power generator is determined by a difference between the electrostatic capacity obtained when the overlapped area is maximized, and the electrostatic capacity obtained when the overlapped area is minimized (for example, zero). The more the difference, the higher the output voltage.

In the vibration power generator 300 of this embodiment, the third electrodes 309c are formed as mentioned above. The first electrodes 309a have the same width 303W regardless of the position of the first electrode. Also, the second electrodes 309b have the same width 304W regardless of the position of the second electrode. Thus, the overlapped area between the first electrode 309a and the second electrode 309b is constantly the same both at the center of vibration and near the circumference of vibration. The electric field distribution is changed due to the width of the third electrode 309c to change the capacity. This effect is used to make the Cp with the first substrate 301 positioned in the center of vibration smaller than the Cp with the first substrate 301 displaced to the maximum displacement position. The adjustment of the capacity by the third electrodes 309c will be described below.

The electret electrode includes the film holding the charge. The charge generates the electric field, which forms an electrostatic capacity together with the opposed first electrode 309a. At this time, near the end surface of the second electrode 309b (surface defining the end in the vibration direction), the electric field is generated not only upward in the drawing, but also laterally. At this time, the amount of pulling the electric field which leaks in the lateral direction can be adjusted by the third electrode 309c to control the capacity formed by the first electrode 309a and the second electrode 309b.

When the width of the third electrode 309c is increased to locate its end surface in the vibration direction near the end surface of the second electrode 309b in the vibration direction, the capacity formed between the first electrode 309a and the second electrode 309b becomes small. When the width of the third electrode 309c is decreased to have its end surface in the vibration direction spaced away from the end surface of the second electrode 309b in the vibration direction, the capacity formed by the first electrode 309a and the second electrode 309b becomes large. In the third embodiment, the width 306W of the third electrode 309c positioned in the center of the second substrate 302 is smaller than the width 307W of the third electrode 309c positioned at the end of the second substrate 302. Thus, the Cp obtained when the first substrate 301 is positioned in the center of vibration is set smaller than the Cp obtained when the first substrate 301 is displaced to the maximum displacement position, whereby the effect (1) described in the first embodiment can be obtained.

In this way, the use of the third electrode 309c changes the Cp while the first substrate 301 is vibrating, so that the electrostatic capacity obtained when the overlapped area between the first electrode 309a and the second electrode 309b is minimized can be decreased as compared to those in the first and second embodiments. This is because the third electrode 309c can forcedly pull the electric field leaking laterally, into the third electrode 309c itself to decrease the capacity obtained when the overlapped area between the first and second electrodes 309a and 309b becomes minimum. In the first and second embodiments, the second electrodes have the different dimensions, which change the electrostatic capacity obtained when the overlapped area between the first and second electrodes becomes minimum. In contrast, the third embodiment can lessen the change in electrostatic capacity obtained when the overlapped area between the first and second electrodes becomes minimum. As a result, this embodiment can prevent the reduction in rate of the change in capacity as compared to the first and second embodiments. In this embodiment, the use of the third electrodes 309c can prevent the reduction in rate of change in capacity to thereby increase the amount of power generation.

The detailed description as to (7) will be made below. The output voltage of the vibration power generator is determined by a difference between the electrostatic capacity obtained when the overlapped area is maximized, and the electrostatic capacity obtained when the overlapped area is minimized (for example, zero). The more the difference, the higher the output voltage. Thus, it is important to decrease the capacity obtained when the overlapped area is minimized.

It can be proposed that the size of either the first electrode 309a or the second electrode 309b is decreased to reduce the overlapped area therebetween, that is, the vibration power generator is designed to have such a structure that is less likely to be affected by the electric field in the lateral direction. The structure, however, has a small capacity Cp (smaller than 100). For this reason, as shown in FIG. 7(b), the third electrodes 309c are formed to pull the electric field leaking in the lateral direction, into the third electrodes 309c, which can decrease the capacity obtained when the overlapped area becomes minimum (or can increase the rate of change in capacity). As a result, this embodiment can increase the amount of power generation without changing the dimension of the electrode (first electrodes, second electrodes) contributing to the power generation, as compared to the vibration power generator without the third electrodes.

This embodiment changes the widths of the third electrodes 309c. In a modified example of this embodiment, the third electrodes may have the same width, but different lengths. Also in this case, the same effects can be obtained.

Figure 18:
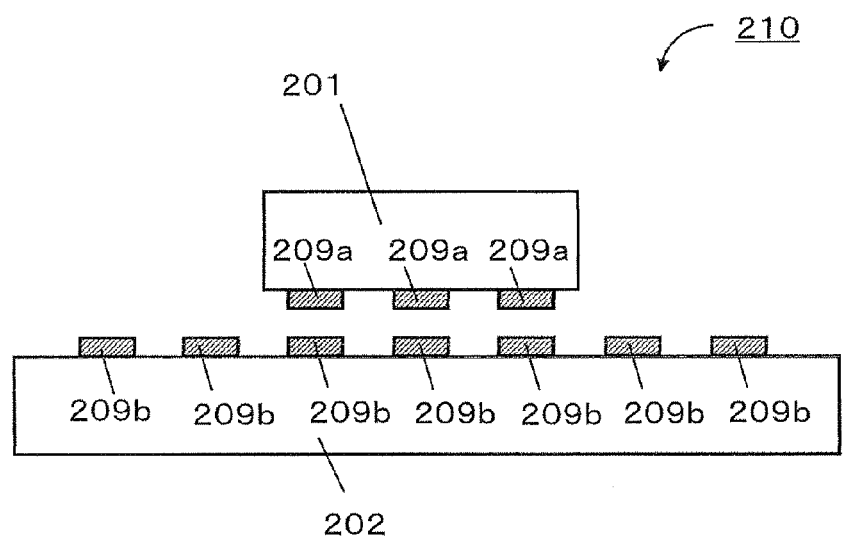
In FIG. 18, (a) is a cross-sectional view of a part of the vibration power generator contributing to the vibration with a first substrate positioned in the center of vibration according to modification of the second embodiment and (b) is a cross-sectional view of the part of the vibration power generator contributing to the vibration with the first substrate displaced to the maximum displacement position according to the modification of the second embodiment.
Figure 18:
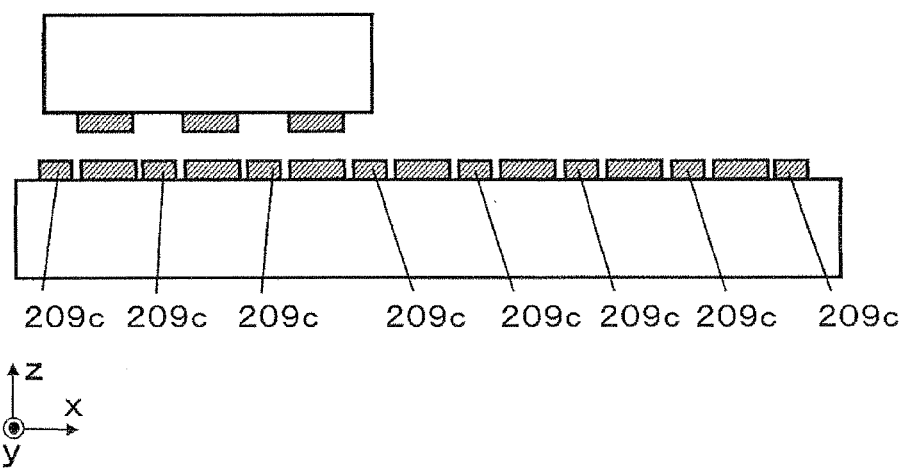
Figure 19:
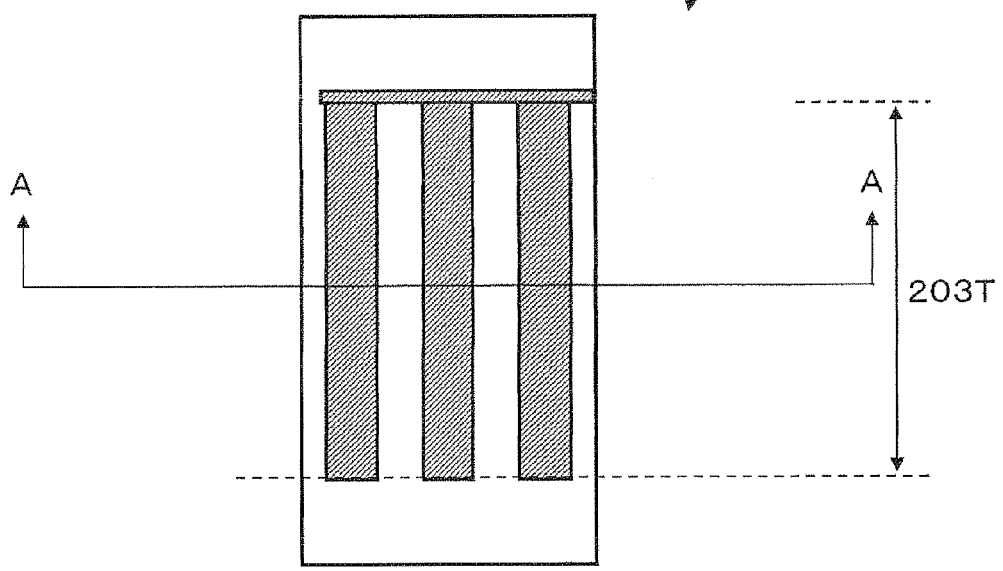
In FIG. 19, (a) is a plan view showing an electrode formation surface and first electrodes on a first substrate of the vibration power generator according to the modification of the second embodiment and (b) is a plan view showing an electrode formation surface and second and third electrodes on a second substrate of the vibration power generator according to the modification of the second embodiment.
Figure 19:
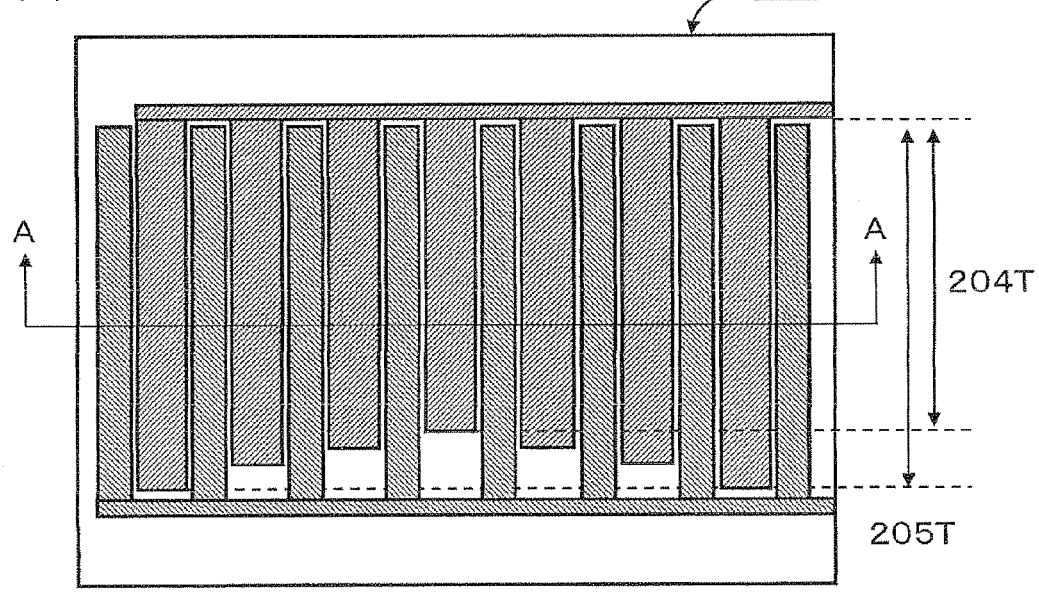

The effects (6) and (7) can be obtained by forming the third electrodes 309c with the same width and length, between the second electrodes 309b. Thus, the effects (6) and (7) can be obtained when the third electrodes are provided in the vibration power generator disclosed in the first and second embodiments. FIGS. 18 and 19 show a modified example of the second embodiment, illustrating a vibration power generator 210 with the third electrodes 209c. In the vibration power generator 210, the third electrodes 209c with the same width and length are disposed between the second electrodes 209b. Thus, during vibration of the first substrate 201, the change in Cp is not caused by the presence of the third electrodes, but by changing the lengths of the second electrodes, as described in the second embodiment.

In another embodiment, the combination of the third embodiment and the second embodiment may be combined. That is, the Cp may be changed by changing the widths of the third electrodes, and the lengths of the second electrodes.

4. Fourth Embodiment

Figure 8:
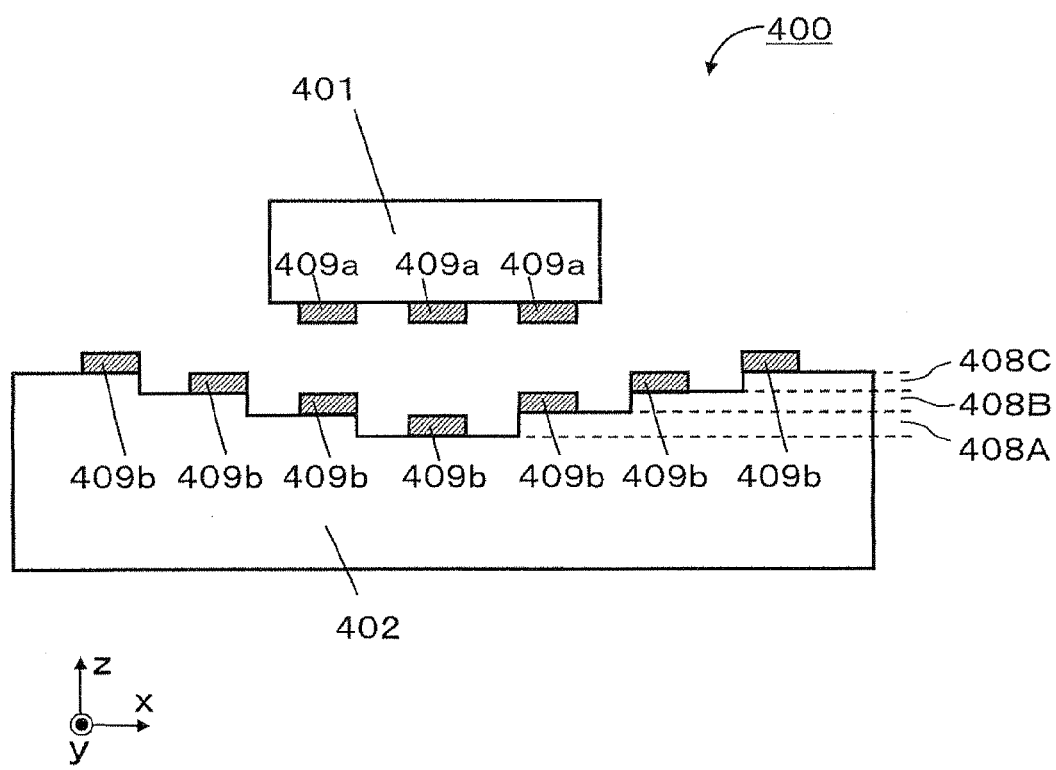
FIG. 8 is a cross-sectional view of an example of a vibration power generator according to a fourth embodiment.

FIG. 8 shows a cross-sectional view of a part of a vibration power generator 400 contributing to the power generation according to a fourth embodiment. For easy understanding, FIG. 8 omits the illustration of a wiring structure and the like. Other parts of the vibration power generator 400 shown in FIG. 8 except for the part contributing to the vibration are the same as those of the vibration power generator 100 shown in FIG. 1.

The fourth embodiment differs from the first embodiment in that the second electrodes 409b have the same length and width, and that the distance between the first electrode 409a and the second electrode 409b (more specifically, the distance between the surfaces of the electrodes) is changed, specifically, decreases in small steps from the center of the second substrate 402 toward the end thereof by a change in thickness of the second substrate 402. In the fourth embodiment, the second substrate 402 has excavated portions with different depths (408A, 408B, and 408C) depending on the position of the second electrode 409b. Specifically, the excavated portion located in the center of vibration of the second substrate 402 is deepest, and the excavated portion located at the end of the second substrate 402 is shallow. The second substrate 402 with such a structure makes the electrostatic capacity Cp small when the first substrate 401 is positioned in the center of vibration, and makes the electrostatic capacity Cp large when the first substrate 401 is positioned at the end of vibration. Thus, the operation and effects of the vibration power generator 400 of the fourth embodiment are the same as those of the vibration power generator 100 of the first embodiment.

Modified Example

Figure 9:
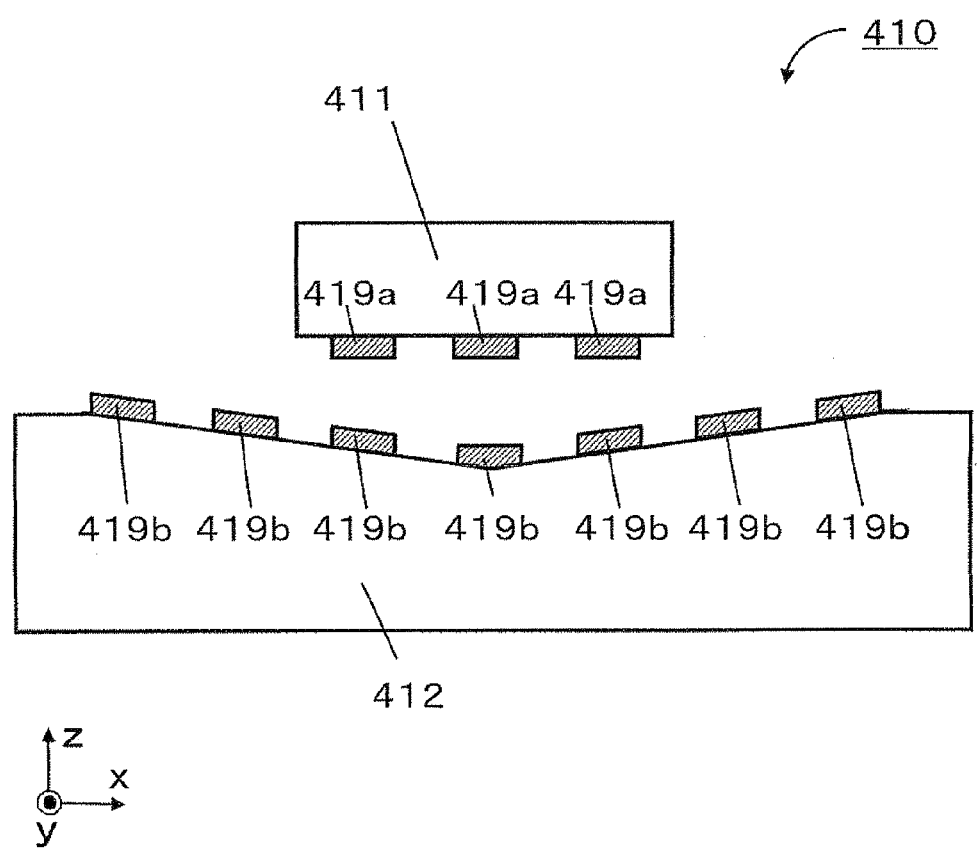
FIG. 9 is a cross-sectional view of another example of the vibration power generator according to the fourth embodiment.

FIG. 9 shows a cross-sectional view of a vibration power generator 410 according to a modified example of this embodiment. The vibration power generator 410 differs from the vibration power generator 400 in that the excavated portions of the second substrate 412 are formed to have not steps, but slants. Other elements (specifically, the first substrate 411, the first electrode 419a, and the second electrode 419b) are the same as those of the vibration power generator 400. Thus, the operation and effects of the vibration power generator 410 are the same as those of the first embodiment.

5. Fifth Embodiment

Figure 10:
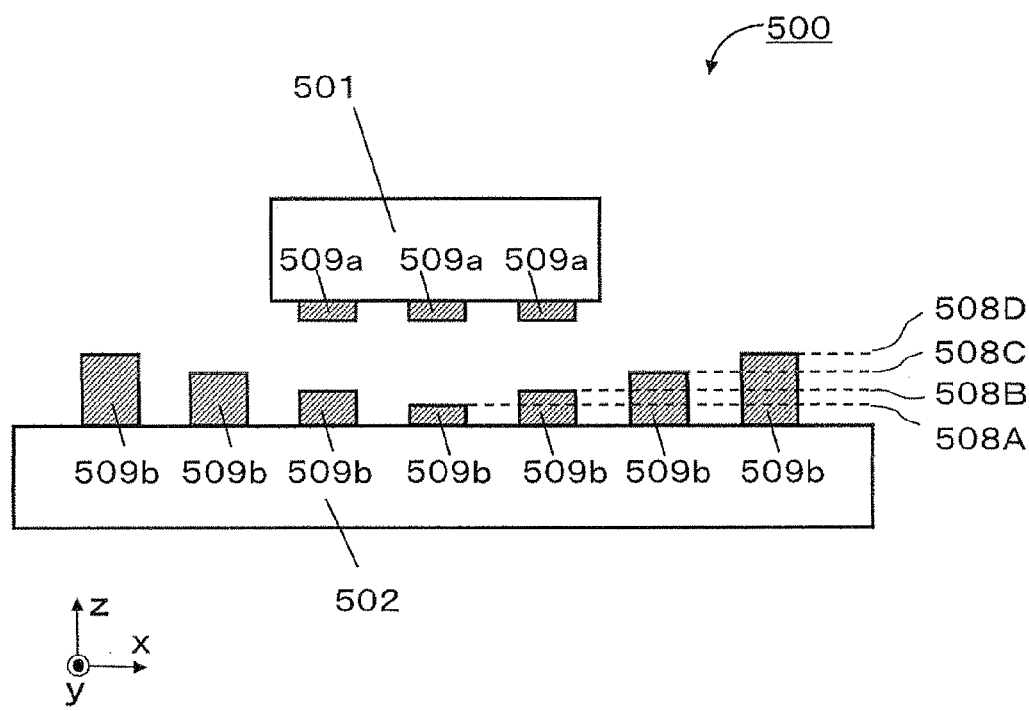
FIG. 10 is a cross-sectional view of a vibration power generator according to a fifth embodiment.

FIG. 10 shows a cross-sectional view of a part of a vibration power generator 500 according to a fifth embodiment which part, which part contributes to the power generation. For easy understanding, FIG. 10 omits illustration of a wiring structure and the like. Other parts of the vibration power generator 500 shown in FIG. 10 except for the part contributing to the vibration are the same as those of the vibration power generator 100 shown in FIG. 1.

The fifth embodiment differs from the first embodiment in that the thickness of the second electrode 509b is different between at the center and at the end of the second substrate 502, although the second electrodes 509b have the same length and width. In the fifth embodiment, the second electrodes 509b have the different thicknesses (508A, 508B, 508C, and 508D) depending on the positions. Specifically, the second electrode 509b positioned in the center of the second substrate 502 has a smaller thickness, and the second electrode 509b positioned closer to the end of the second substrate 502 has a larger thickness. Such formation of the second electrodes 509b makes the electrostatic capacity Cp between the first and second electrodes 509a and 509b small when the first substrate 401 is positioned in the center of vibration, and makes the electrostatic capacity Cp large when the first substrate 401 is positioned at the end of vibration. Thus, the operation and effects of the vibration power generator 500 in the fifth embodiment are the same as those of the vibration power generator of the first embodiment.

6. Sixth Embodiment

A vibration power generation apparatus according to a sixth embodiment will be described below.

Figure 11:
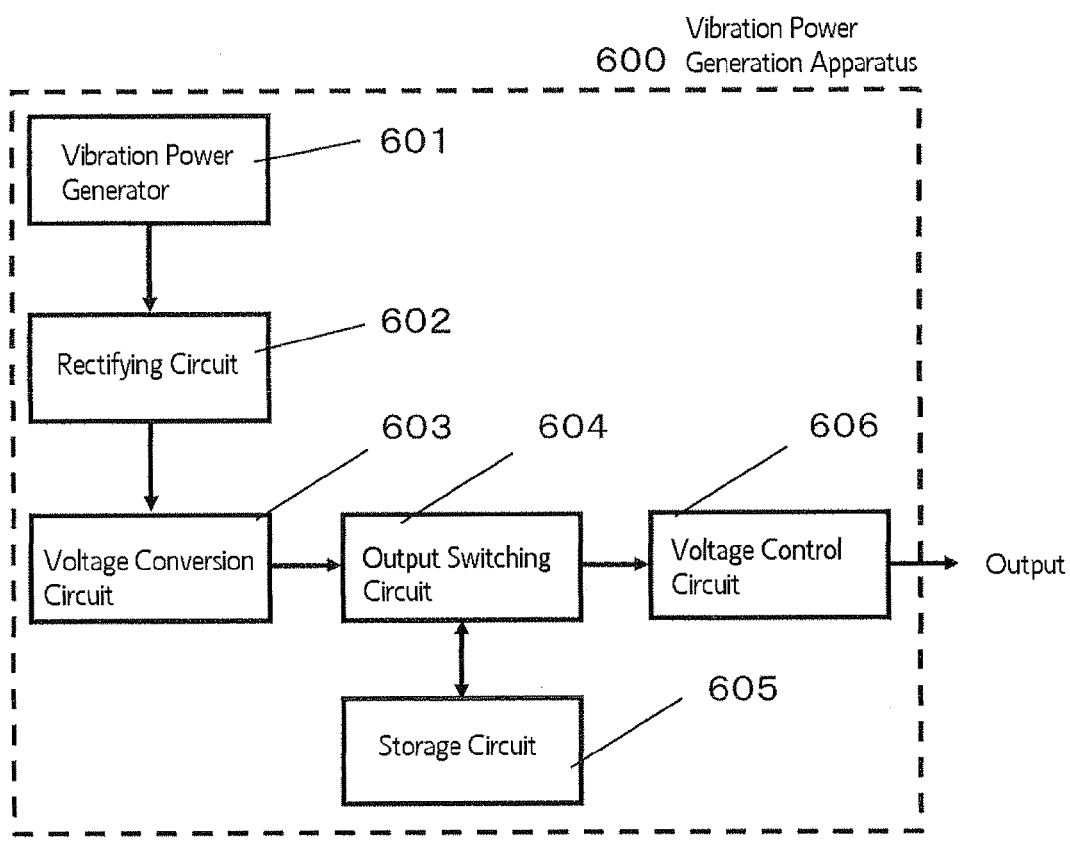
FIG. 11 is a block diagram showing a vibration power generation apparatus according to a sixth embodiment.

FIG. 11 shows a block diagram of a vibration power generation apparatus 600 according to this embodiment. A vibration power generator 601 shown in FIG. 11 is any one of the vibration power generators of the first to fifth embodiments.

Referring to FIG. 11, the vibration power generation apparatus 600 includes the vibration power generator 601, a rectifying circuit 602, a voltage conversion circuit 603, an output switching circuit 604, a storage circuit 605, and a voltage control circuit 606. An AC voltage output from the vibration power generator 601 is converted into a DC voltage by the rectifying circuit 602. The DC voltage is input to the voltage conversion circuit 603, and converted into a voltage at the output voltage level of the vibration power generation apparatus 600. The converted voltage is input to the voltage control circuit 606 or storage circuit 605 via the output switching circuit 604. Output is made by the voltage control circuit 606 which controls the output voltage at a certain level.

The operation of the vibration power generation apparatus 600 with the above structure will be described below with reference to FIG. 12.

Figure 12:
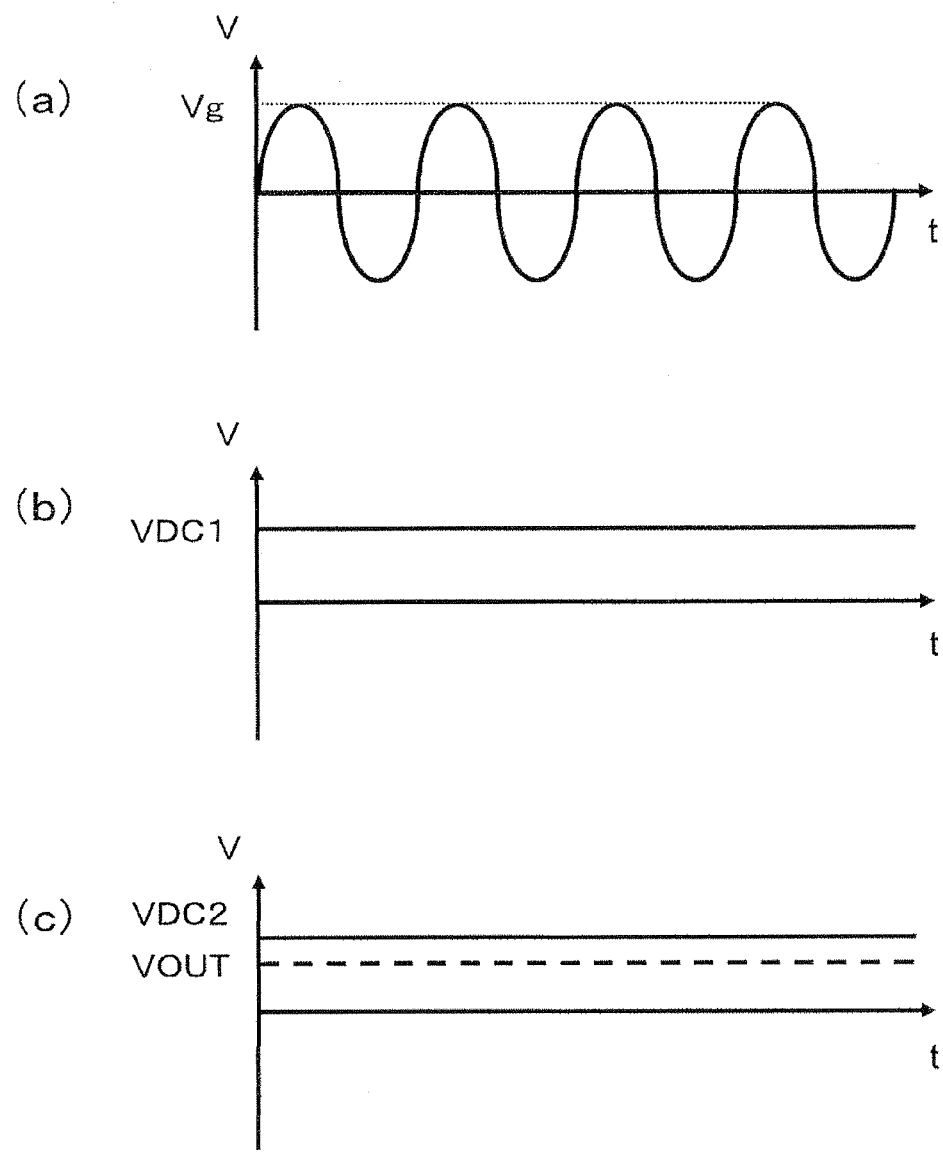
FIG. 12 is a diagram showing voltage waveforms of respective components of the vibration power generation apparatus according to the sixth embodiment.

FIG. 12 shows voltage waveforms of respective components of the vibration power generation apparatus 600. FIG. 12(a) shows a waveform of the output voltage from the vibration power generator 601. For simplifying, the description is made in this embodiment assuming that the power generation is effectively performed even when the displacement direction of the first substrate is changed, and the fluctuations in overlapped area due to the vibration causes and outputs a sinusoidal voltage. The output voltage of the vibration power generator 601 (voltage amplitude Vg) differs depending on the vibration amplitude of the first substrate, a gap between the first and second substrates, the amount of charges held by the electret film, and the level of an external impedance as viewed from the vibration power generator 601. An AC voltage output from the vibration power generator 601 is converted into a DC voltage VDC1 by the rectifying circuit 602 (see FIG. 12(b)). The VDC1 is converted into an output voltage level VDC2 of the vibration power generation apparatus 600 by the voltage conversion circuit 603. The output switching circuit 604 performs switching to store the power generated in the storage circuit 605 without outputting to the voltage control circuit 606 when the voltage does not need to be output from the vibration power generation apparatus 600. The switching circuit 604 performs switching to output the power stored in the storage circuit 605 when the power needs to be output from the vibration power generation apparatus 600 but the amount of generated power is small. The output from the output switching circuit 604 is controlled to a desired output voltage VOUT to be output (see FIG. 12C) by the voltage control circuit 606.

As mentioned above, the output voltage of the vibration power generator 600 is changed due to various causes. For adapting to this change, the VDC2 may be set to a slightly higher voltage than the voltage VOUT finally output. Such setting can make the output voltage constant even in slight fluctuations in voltage. For example, the case of outputting a voltage of 1.8 V will be described. When the VDC2 is set to 1.8 V, the decrease in output voltage of the vibration power generator also decreases the output voltage of the vibration power generator 600. For example, when the VDC2 is set to 2.0 V, control can be sufficiently made for the decrease in voltage by 0.2 V, which is very effective in terms of usage.

Figure 13:
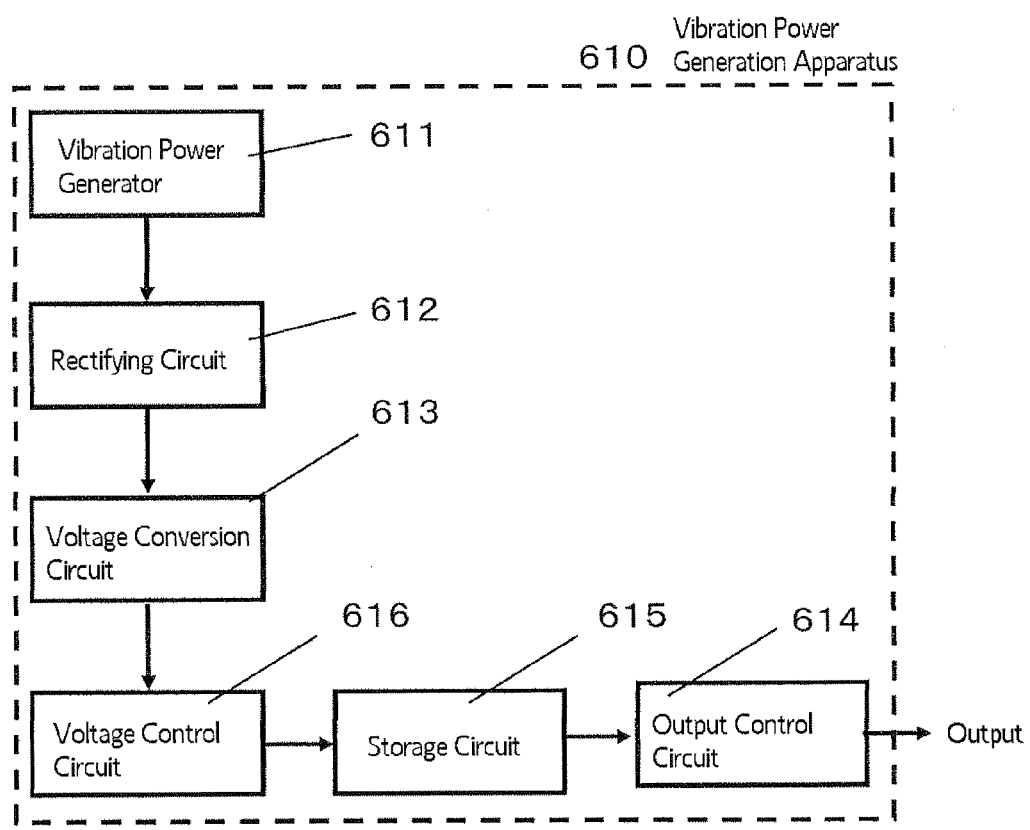
FIG. 13 is a block diagram showing another structure of the vibration power generation apparatus according to the sixth embodiment.

FIG. 13 is a block diagram showing a vibration power generation apparatus 610 with another structure according to this embodiment.

In FIG. 13, a vibration power generator 610 is one of the vibration power generators disclosed in any one of the first to fifth embodiments.

The vibration power generation apparatus 610 includes the vibration power generator 611, a rectifying circuit 612, a voltage conversion circuit 613, an output switching circuit 614, a storage circuit 615, and a voltage control circuit 616. An AC voltage output from the vibration power generator 611 is converted into a DC voltage by the rectifying circuit 612. The DC voltage is input to the voltage conversion circuit 613, and converted into a voltage at a controllable voltage level of the vibration power generation apparatus 610. The converted voltage is controlled to a desired level by the voltage control circuit 616, and input to the storage circuit 615. The output control circuit 614 controls the electrical power stored in the storage circuit 615 according to the state of a load, and outputs the electric power to the load.

It is needless to say that the vibration power generation apparatus 610 with such a structure also gives the same effects as the vibration power generation apparatus 600.

The vibration power generation apparatus 610 has substantially the same operation as that of the vibration power generation apparatus 600, but differs in that an output voltage of the voltage control circuit 616 is set to be controlled to an optimal voltage to the storage circuit 615. The output control circuit 614 controls the output from the vibration power generation apparatus 610 depending on the state of the load.

7. Seventh Embodiment

Figure 14:
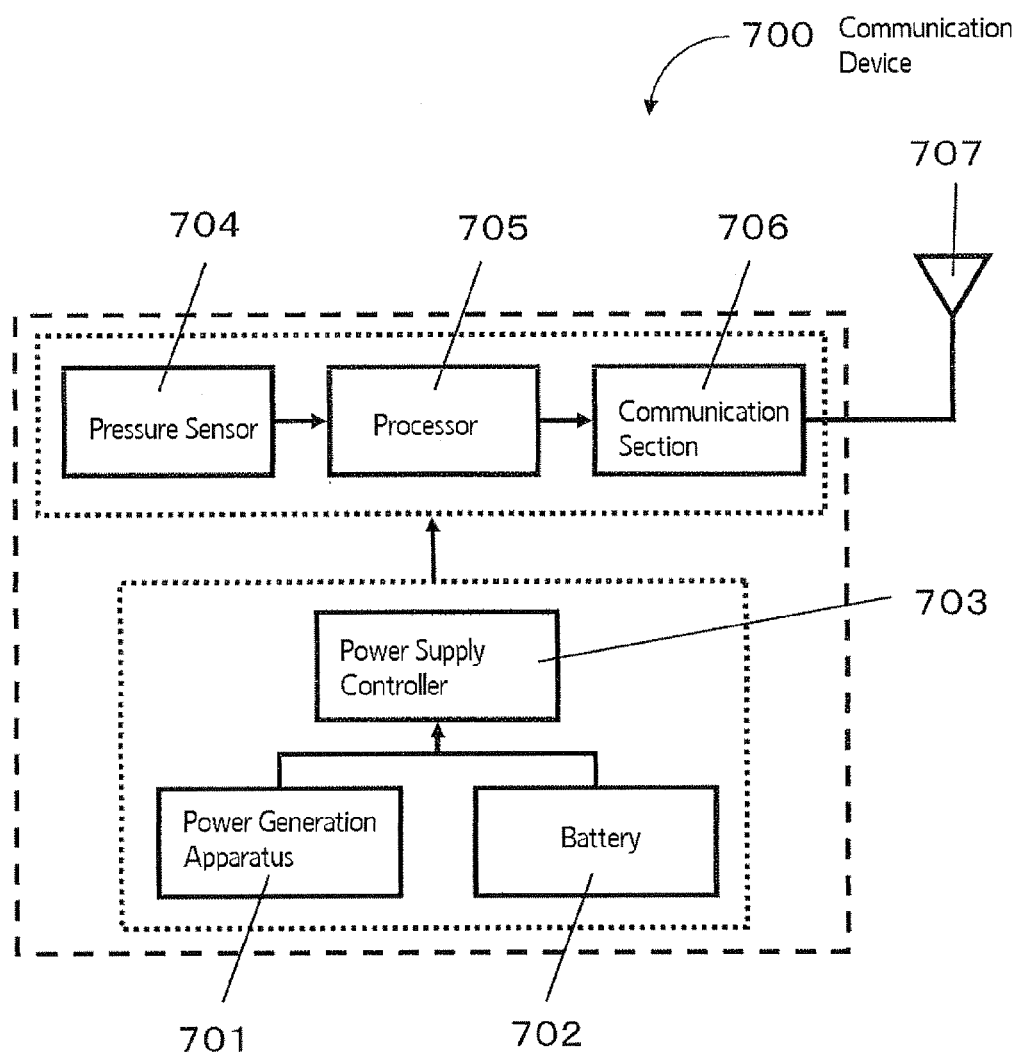
FIG. 14 is a diagram showing a communication device according to a seventh embodiment wherein a vibration power generation apparatus is used.

FIG. 14 is a block diagram of a communication device 700 used in a tire air pressure monitoring system to be mounted on a vehicle. In FIG. 14, a power generation apparatus 701 is the vibration power generation apparatus of the sixth embodiment.

As shown in FIG. 14, the communication device 700 includes: the power generation apparatus 701 for generating power by vibration; and a battery 702 serving as a main power supply for the communication device or a sub-power supply of the power generation apparatus 701; a power supply controller 703 for switching between an output from the power generation apparatus 701 and an output from the battery 702 to supply the output to a circuit; a pressure sensor 704 for measuring an air pressure of the tire; a processor 705 for processing the output from the pressure sensor to send the processed output to a communication section; the communication section 706 for converting an input signal from the processor 705 to a high frequency signal to transfer the signal to an antenna 707; and the antenna 707.

The operation of the communication device 700 with the above-mentioned structure will be described below.

The power supply controller 703 supplies the electric power necessary for operation of the pressure sensor 704, the processor 705, and the communication section 706, from the power generation apparatus 701 or the battery 702. The pressure sensor 704 measures the air pressure of the tire, and converts the result of measurement into a voltage signal, which is input to the processor 705. The signal processed by the processor 705 is input to the communication section 706, and transmitted from the antenna 707 as a high frequency signal.

The use of the vibration power generation apparatus as the power source for the communication device in this way can reduce the number of maintenance operations, including the battery replacement, or can eliminate the battery replacement. This improves the convenience of the communication device itself, and contributes to resource saving and environmental protection.

This embodiment has described an example of using both the vibration power generation apparatus and the battery. When the output power from the vibration power generation apparatus can sufficiently cover the power to be consumed in the circuits such as the pressure sensor, the processor, and the communication section, as well as the power required for communication, only the vibration power generation apparatus may be used as a power supply. In such a case, the battery and the power supply controller are not required, which is advantageous in reduce of the size of the device.

This embodiment illustrates the block diagram of the communication device equipped with only the pressure sensor. It is apparent that the same effects can be achieved in a communication device equipped with a sensor and a control circuit for controlling power by detecting the operation state of a vehicle.

This embodiment has described an example of using the vibration power generation apparatus with the vibration power generator described in any one of the first to fifth embodiments. Any other vibration power generator provides the same effects as long as the power generator can convert the external vibration into the electric power.

8. Eighth Embodiment

Figure 15:
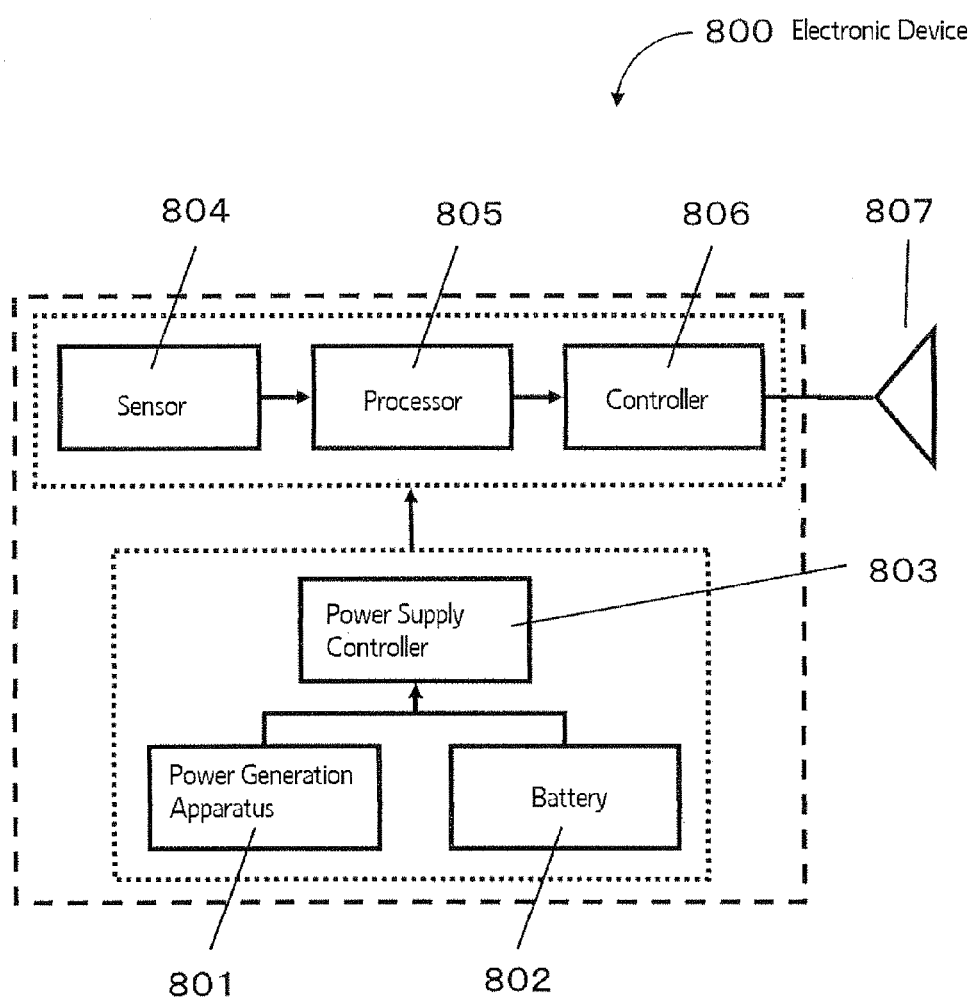
FIG. 15 is a diagram sowing an electronic device according to an eighth embodiment wherein a vibration power generation apparatus is used.

FIG. 15 shows a block diagram of an electronic device 800 that makes sounds to be mounted on toys or the like. In FIG.

15, a power generation apparatus 801 is the vibration power generation apparatus of the sixth embodiment.

As shown in FIG. 15, the electronic device 800 includes: the power generation apparatus 801 for generating power by vibration; a battery 802 serving as a main power supply for the communication device or a sub-power supply of the power generation apparatus 801; a power supply controller 803 for switching between an output from the power generation apparatus 801 and an output from the battery 802 to supply the output to a circuit; a sensor 804 for detecting a response from the outside (for example, a button push, a slant, or the like); a processor 805 for processing the output from the sensor to transfer the processed output to a communication section, a controller 806 for transmitting an input signal from the processor 805 to a speaker 807; and the speaker 807.

The operation of the communication device (electronic device) 800 with the above-mentioned structure will be described below.

The power supply controller 803 supplies the electric power necessary for the operation of the sensor 804, the processor 805, and the controller 806, from the power generation apparatus 801 or the battery 802 to the communication device. The sensor 804 detects the response from the outside and inputs the result of detection to the processor 805. When a signal processed by the processor 805 exceeds a desired level, the signal is input to the controller 806 to produce sound from the speaker 807.

In this way, the use of the vibration power generation apparatus as a power source for the electronic device in this way can decrease the number of maintenance operations, including battery replacement, or can eliminate the battery replacement. This improves the convenience of the communication device itself, and contributes to resource saving and environmental protection.

This embodiment has described an example of using both the vibration power generation apparatus and the battery. When the output power from the vibration power generation apparatus can sufficiently cover the power to be consumed in circuits, including the sensor, the processor, or the communication section, as well as the power required for communication, only the vibration power generation apparatus may be used as a power supply. In such a case, the battery and the power supply controller are not needed, which is advantageous in reduction in the size of the device.

This embodiment has described an example of using the vibration power generation apparatus with the vibration power generator described in any one of the first to fifth embodiment. Any other vibration power generator provides the same effects as long as the power generator can convert the external vibration into the electric power.

It is to be understood that all embodiments disclosed herein are just illustrative and not limitative of the present invention from all points of view. The scope of the present invention is indicated not by the above explanation, but by the following claims. It is intended that all various modifications and changes can be made within the accompanied claims and their equivalents.

INDUSTRIAL APPLICABILITY

The vibration power generator according to an embodiment of the present invention can suppress the change in output voltage while the vibratory substrate is vibrating to thereby stabilize the output voltage, and thus can effectively take out the power generated. Thus, the vibration power generator according to the embodiment of the invention is very useful for applications, including a wireless communication module of low power, other electronic devices, and the like.

DESCRIPTION OF REFERENCE NUMERALS 100, 200, 210, 300, 400, 410, 500 Vibration power generator
101, 201, 301, 401, 411, 501 First substrate
102, 202, 302, 402, 412, 502 Second substrate
109a, 209a, 309a, 409a, 419a, 509a First electrode
109b, 209b, 309b, 409b, 419b, 509b Second electrode
408A, 408B, 408C Difference in level
508A, 508B, 508C, 508D Difference in level of electrode surface
600 Vibration power generation apparatus
700 Communication device
800 Electronic device

The invention claimed is:

1. A vibration power generator comprising:
a first substrate;
a plurality of first electrodes disposed over one surface of the first substrate;
a second substrate spaced from the first substrate and opposed to the one surface of the first substrate; and
a plurality of second electrodes disposed over one surface of the second substrate so as to be opposed to the first electrodes,
wherein one of the first electrodes and the second electrodes comprises a film holding a charge,
wherein one of the first substrate and the second substrate is a vibratory substrate which vibrates with respect to the other of the first substrate and the second substrate,
wherein the first electrodes and the second electrodes are configured such that an overlapped area between the first electrodes and the second electrodes viewed in the direction perpendicular to the surface of the first substrate changes at least one time in such a manner that the overlapped area becomes minimum and then increases to become maximum, or that the overlapped area becomes maximum and then decreases to become minimum, as the vibratory substrate is displaced from a center of vibration to an end of vibration,
wherein an electrostatic capacity Cp formed between the first electrodes and the second electrodes when the overlapped area between the first electrodes and the second electrodes becomes a maximum changes while the vibratory substrate is displaced from the center of the vibration to the end of the vibration, and the change in electrostatic capacity Cp comprises an increase in electrostatic capacity Cp, and
wherein power is generated by the change in the overlapped area between the first electrodes and the second electrodes.

2. The vibration power generator according to claim 1,
wherein the overlapped area between the first electrodes and the second electrodes is defined as Ap;
wherein the vibratory substrate is the first substrate, the overlapped area between the first electrodes and the second electrodes Ap when the overlapped area between the first and second electrodes becomes maximum changes while the first substrate is displaced from the center of vibration to the end of vibration, and
wherein the first and second electrodes are formed such that the change in overlapped area Ap comprises an increase in overlapped area Ap which increases the electrostatic capacity Cp while the vibratory substrate is displaced from the center of vibration to the end of vibration.

3. The vibration power generator according to claim 2, wherein the first electrodes and the second electrodes have a rectangular shape as viewed in the direction perpendicular to the surface of the first substrate,
   wherein a width of each of the first and second electrodes extends in a direction parallel to a vibrational direction of the vibratory substrate, and a length of each of the first and second electrodes extends in a direction perpendicular to the vibrational direction and parallel to a surface of the respective substrate, wherein the first electrodes have a certain width and a certain length, and
   the width and/or the length of one of the second electrodes positioned in the center of the second substrate is smaller than the width and/or the length of one or more of the second electrodes positioned on an end side of the second substrate.

4. The vibration power generator according to claim 3, wherein a plurality of third electrodes are disposed between the second electrodes over the one surface of the second substrate with the second electrodes formed thereon, each third electrode being comprised of a conductor of a rectangular shape as viewed in a direction perpendicular to the surface of the first substrate.

5. The vibration power generator according to claim 1, wherein each of the first electrodes and the second electrodes have a rectangular shape as viewed in the direction perpendicular to the surface of the first substrate,
   a plurality of third electrodes are disposed between the second electrodes over the one surface of the second substrate with the second electrodes formed thereon, each third electrode being comprised of a conductor of a rectangular shape as viewed in a direction perpendicular to the surface of the first substrate, and
   the width of one of the third electrodes positioned in the center of the second substrate is larger than that of one or more of the third electrodes positioned on an end side of the second substrate.

6. The vibration power generator according to claim 1, wherein the vibratory substrate is the first substrate and the respective surfaces of the first electrodes are positioned at the same distance from the surface of the first substrate, and
   a distance between one of the second electrodes positioned at a center of the second substrate and the surface of the first substrate is greater than a distance between one or more of the second electrodes positioned on an end side of the second substrate and the surface of the first substrate.

7. The vibration power generator according to claim 6, wherein the thickness of the second substrate is larger on the end side of the second substrate than at the center of the second substrate, and/or
   the thickness of the one or more second electrode disposed at the end side of the second substrate is larger than the thickness of the second electrode disposed at the center of the second substrate.

8. A vibration power generation apparatus comprising:
   the vibration power generator according to claim 1; and
   a rectifying circuit for rectifying an AC output voltage from the vibration power generator to convert the AC voltage into a DC voltage.

9. The vibration power generation apparatus according to claim 8, further comprising:
   a voltage conversion circuit for converting the DC voltage output from the rectifying circuit into a voltage at a predetermined voltage level;
   a storage circuit for storing power generated by the vibration power generator when an output from the vibration power generation apparatus is unnecessary;
   a voltage control circuit for controlling an output voltage from the voltage conversion circuit or the storage circuit to a predetermined voltage; and
   an output switching circuit for switching the output from the voltage conversion circuit to the storage circuit or the voltage control circuit.

10. The vibration power generation apparatus according to claim 9, wherein the output voltage from the voltage conversion circuit is set higher than the output voltage of the vibration power generation circuit.

11. A communication device using the vibration power generation apparatus according to claim 8.

12. An electronic device using the vibration power generation apparatus according to claim 8.

13. A communication device comprising the vibration power generator according to claim 1, and a battery.

14. An electronic device comprising the vibration power generator according to claim 1, and a battery.

* * * * *